(12) United States Patent
Ohno

(10) Patent No.: US 7,216,122 B2
(45) Date of Patent: May 8, 2007

(54) INFORMATION PROCESSING DEVICE AND METHOD, RECORDING MEDIUM, AND PROGRAM

(75) Inventor: Shiomi Ohno, Kanagawa (JP)

(73) Assignee: Sony Corporation (JP)

( * ) Notice: Subject to any disclaimer, the term of this patent is extended or adjusted under 35 U.S.C. 154(b) by 439 days.

(21) Appl. No.: 10/697,467

(22) Filed: Oct. 30, 2003

(65) Prior Publication Data

US 2004/0117363 A1 Jun. 17, 2004

(30) Foreign Application Priority Data

Nov. 13, 2002 (JP) ............................ P2002-329492

(51) Int. Cl.
*G06F 17/30* (2006.01)

(52) U.S. Cl. ....................................................... 707/3
(58) Field of Classification Search ...................... 707/3
See application file for complete search history.

(56) References Cited

U.S. PATENT DOCUMENTS

| | | | |
|---|---|---|---|
| 6,012,053 A * | 1/2000 | Pant et al. ...................... | 707/3 |
| 6,584,468 B1 * | 6/2003 | Gabriel et al. ................. | 707/10 |
| 2002/0138478 A1 * | 9/2002 | Schwartz et al. .............. | 707/3 |
| 2003/0101286 A1 * | 5/2003 | Kolluri et al. ............... | 709/316 |
| 2003/0202468 A1 * | 10/2003 | Cain et al. .................... | 370/229 |
| 2004/0030688 A1 * | 2/2004 | Aridor et al. .................. | 707/3 |
| 2004/0122811 A1 * | 6/2004 | Page ............................. | 707/3 |

* cited by examiner

*Primary Examiner*—Don Wong
*Assistant Examiner*—Angela M Lie
(74) *Attorney, Agent, or Firm*—Lerner, David, Littenberg, Krumholz & Mentlik, LLP

(57) ABSTRACT

In order to provide pages relating to a prescribed page to a user in a precise manner over the internet, a site page processor collects pages included at various sites, determines parent-child relationships between the pages, and stores the results of such determinations in a site page data storage section. A related page data processor calculates the relevance between pages using page feature extraction values given weightings taking into consideration at least one of a sibling relationship and a co-parent relationship between pages using data stored in the site page data storage section. Through this page feature extraction, words used in common on pages in link relationships are processed so as not to have a substantial influence on the calculation of relevance. The system can be applied to a server on the Internet for searching for pages relating to a prescribed page.

8 Claims, 25 Drawing Sheets

FIG. 12

| COLLECTION START URL (Key) | INCLUDED DIRECTORY | EXCLUDED DIRECTORY | INCLUDED DOMAIN | EXCLUDED DOMAIN |
|---|---|---|---|---|
| www.ssss.co.jp/index.html | | | | |
| www.vaaa.sss.co.jp/index.html | | | | |
| www.spe.co.jp/index.html | | | | |

| SITE ID (Key) | SITE NAME | TOTAL NUMBER OF PAGES |
|---|---|---|
| 0001 | www.ssss.co.jp | 12345 |
| 0002 | www.ssss.music.co.jp | 4321 |

| PAGE ID (Key) | SITE ID | PAGE URL | TITLE | SUMMARY | PAGE SAVED AT | LAST UPDATED |
|---|---|---|---|---|---|---|
| 00010000001 | 0001 | www.ssss.co.jp/index.html | Ssss | Ssss Corp. | A/index.html | 2002-07-10 |
| 00020000001 | 0002 | www.spe.co.jp/index.html | SPE | SPE Japan | B/index.html | 2002-07-10 |

| WORD ID (Key) | WORD |
|---|---|
| 000001 | MOVIE |
| 000002 | MUSIC |

| WORD ID (Key 1) | SITE ID (Key 2) | NUMBER OF PAGES INCLUDING THE WORD WITHIN THIS SITE | IDs OF PAGES INCLUDING THE WORD WITHIN THIS SITE |
|---|---|---|---|
| 000001 | 001 | 30 | 0001000001,0001000002,......... |
| 000001 | 002 | 15 | 0002000001,0002000004,......... |

| PAGE ID (Key) | WORDS APPEARING | TITLE | KEYWORDS | DESCRIPTION |
|---|---|---|---|---|
| 0001000001 | {WORD ID, NUMBER OF APPEARANCES} | {WORD ID, NUMBER OF APPEARANCES} | {WORD ID, NUMBER OF APPEARANCES} | {WORD ID, NUMBER OF APPEARANCES} |
| 0001000002 | {WORD ID, NUMBER OF APPEARANCES} | {WORD ID, NUMBER OF APPEARANCES} | {WORD ID, NUMBER OF APPEARANCES} | {WORD ID, NUMBER OF APPEARANCES} |

| PAGE ID (Key 1) | LINK DESTINATION PAGE ID (Key 2) | LINK WEIGHTING | WORDS WITHIN ANCHOR WINDOW |
|---|---|---|---|
| 00010000001 | 00010000002 | 1.4 | {WORD ID, NUMBER OF APPEARANCES}........ |
| 00010000001 | 00010000005 | 1.3 | {WORD ID, NUMBER OF APPEARANCES}........ |

| PAGE ID (Key 1) | SIBLING PAGE ID (Key2) | LINK WEIGHTING |
|---|---|---|
| 00010000005 | 00010000007 | 1.5 |
| 00010000005 | 00020000002 | 1.3 |

191

| PAGE ID (Key) | WORD ID INCLUDED IN PAGE ID AND SUM TOTAL OF WEIGHTINGS OF LINKS OF SIBLING PAGES INCLUDING THIS WORD ID |
|---|---|
| 0001000001 | {WORD ID, SUM TOTAL OF LINK WEIGHTINGS}, {WORD ID, SUM TOTAL OF LINK WEIGHTINGS}......... |
| 0001000002 | {WORD ID, SUM TOTAL OF LINK WEIGHTINGS}, {WORD ID, SUM TOTAL OF LINK WEIGHTINGS}......... |

| PAGE ID (Key) | VECTOR |
|---|---|
| 0001000001 | {PAGE ID, WEIGHTING}......... |
| 0001000002 | {PAGE ID, WEIGHTING}......... |

| PAGE ID (Key 1) | TARGET PAGE ID (Key2) | RELEVANCE | HIGH RELEVANCE WORDS |
|---|---|---|---|
| 0001000001 | 0001000002 | 0.10 | {WORD ID, WORD RELEVANCE}......... |
| 0001000001 | 0001000003 | 0.40 | {WORD ID, WORD RELEVANCE}......... |
| 0001000001 | 0001000004 | 0.12 | {WORD ID, WORD RELEVANCE}......... |

~194

SIBLINGS

CO-PARENTS

FIG. 28

| PAGE ID (Key 1) | CO-PARENT PAGE ID (Key 2) | LINK WEIGHTING |
|---|---|---|
| 00010000007 | 00010000006 | 1.2 |
| 00010000008 | 00020000006 | 1.4 |

| PAGE ID (Key) | WORD ID INCLUDED IN PAGE ID AND SUM TOTAL OF LINK WEIGHTING OF CO-PARENT PAGES INCLUDING THAT WORD ID |
|---|---|
| 00010000007 | {WORD ID, SUM TOTAL OF LINK WEIGHTINGS}, {WORD ID, SUM TOTAL OF LINK WEIGHTINGS}......... |
| 00010000008 | {WORD ID, SUM TOTAL OF LINK WEIGHTINGS}, {WORD ID, SUM TOTAL OF LINK WEIGHTINGS}......... |

262

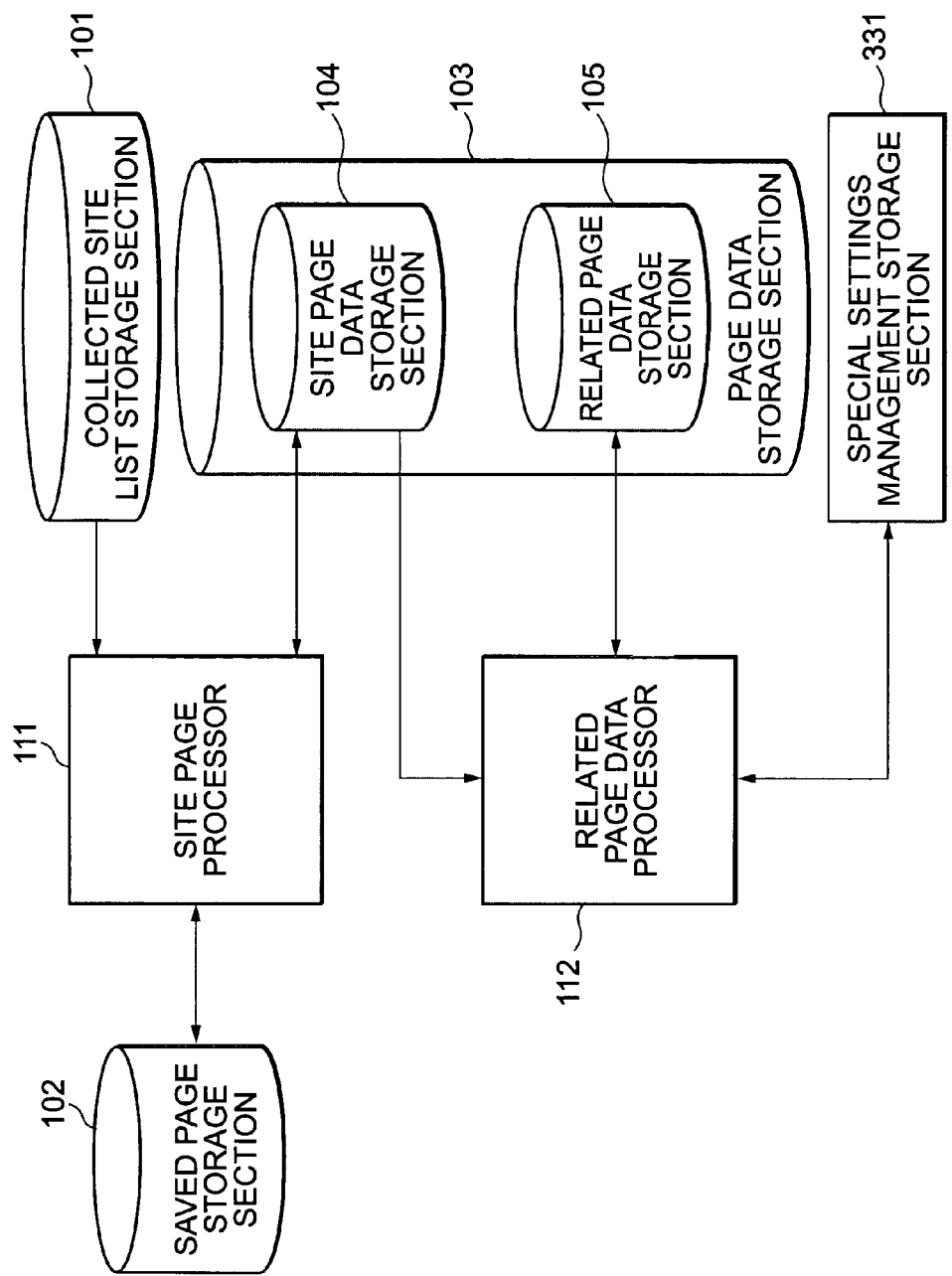

FIG. 33

| TITLE | LINK DESTINATION URL (Key) | DESCRIPTION | WORD | URL PATTERN | OWNER ID |
|---|---|---|---|---|---|
| ssss News | www.ssss.co.jp/News/index.html | ssss News | News | News | 0001 |
| ssss Present | www.ssss.co.jp/Present/index.html | ssss Present | Present | Present | 0002 |

341 SPECIAL SETTINGS MANAGEMENT DATA STORAGE SECTION

FIG. 34

| OWNER ID (Key) | NAME | DEPT. | E-MAIL | ACCOUNT | PASSWORD |
|---|---|---|---|---|---|
| 0001 | AAAA | HP Dept. | aaaa@shp.ssss.co.jp | aaaa | aaapwd |
| 0002 | SSSS | Advertising Dept. | ad@ssss.co.jp | ad | adpwd |

342 SPECIAL SETTINGS ADMINISTRATOR DATA STORAGE SECTION

INFORMATION PROCESSING DEVICE AND METHOD, RECORDING MEDIUM, AND PROGRAM

CROSS REFERENCE TO RELATED APPLICATIONS

The present document claims priority to Japanese Priority Document JP 2002-329492, filed in the Japanese Patent Office on Nov. 13, 2002, the entire contents of which are incorporated herein by reference to the extent permitted by law.

BACKGROUND OF THE INVENTION

1. Field of the Invention

The present invention relates to an information processing device and method, a recording medium, and a program, and particularly relates to an information processing device and method, recording medium, and program appropriate for use in searching for homepages etc. set up in a network.

2. Description of Related Art

In recent years, the number of homepages set up on the Internet has increased with the proliferation of the Internet itself. Homepages are not just being set up by businesses but also by individual users, meaning that the number of homepages is colossal. Searching out homepages carrying information desired by a user from this enormous number of homepages is therefore very troublesome.

In order to alleviate such troublesomeness, homepages commonly referred to as "search engines" such as, for example, "Yahoo" (trademark), "goo" (trademark), "Excite" (trademark), "Google" (trademark) and "Netscape" (trademark) have started to provide services to enable desired homepages to be searched simply by inputting keywords, etc.

These search engines are suited to looking for homepages containing keywords inputted by the user that have similar features to those of the keywords, but it is often the case that there are pages, other than those successfully found, that the user would probably have liked to have seen.

As a result, several search engines have started related page search engine services referred to as "related page searches," etc. For example, there exist patent document 1 and a related page search for pages returned by Google search results, a related page search button in the Google Toolbar, and a related site search button displayed in browsers such as Netscape Navigator.

[Patent Document 1]

Japanese Patent Application Publication No. 2002-149698 (pages 4 to 7).

Searches employing a related page search engine search for pages related to a page a user is currently browsing or for prescribed pages included in search results returned by the search engine. This search takes into consideration the WWW (World Wide Web) link structure, but it is not necessarily the case that searches for related pages are carried out with high precision.

SUMMARY OF THE INVENTION

The generation of a page model by conventional page feature extraction was not a means for related page searching, but rather a means for evaluating the similarity between inputted keywords and natural language, and pages constituting search targets, and therefore not suited for page feature extraction in searching for related pages. In related page searches, it is therefore necessary that a page model be generated based on page feature extraction suitable for performing related page searches.

The present invention is made in view of such circumstances, and fulfills a need to perform searches for related pages in a more precise manner by generating page models appropriate for related page searches by extracting features of pages taking into consideration, of a variety of link structures, a sibling relationship and/or a co-parent relationship and providing a related page search engine based on this page model.

An information processing device of the present invention comprises: acquisition means for acquiring data for pages constituting sites; extraction means for extracting words appearing within the pages using the data for the pages acquired by the acquisition means; counting means for counting the number of times the words extracted by the extraction means appear within the pages; first generating means for analyzing the link structure between the pages acquired by the acquisition means, and generating first weightings for between the pages in linked relationships using values of counts by the counting means; second generating means for generating second weightings for between other pages in linked relationships with a prescribed page using the first weightings generated by the first generating means; third generating means for generating at least one of SDF (abbreviation of Sibling Document Frequency) data and CDF (abbreviation of Co-Parent Document Frequency) data using the second weightings generated by the second generating means; and calculating means for calculating prescribed values using page model extension processing based on at least one of ISDF (abbreviation of Inverse Sibling Document Frequency) and ICDF (abbreviation of Inverse Co-Parent Document Frequency) using the data generated by the third generating means.

Second calculating means for calculating, of the acquired pages, the relevance between prescribed pages using the prescribed values calculated by the calculating means may also be provided.

When the second generating means takes a prescribed page as a link source, and calculates the second weighting for between link destination pages linked to from the link source, the third generating means may generate the SDF data, and the calculating means may calculate the prescribed values using page model extension processing based on the ISDF. When the second generating means takes a prescribed page as a link destination, and calculates the second weighting for between link source pages that link to the link destination, the third generating means may generate the CDF data, and the calculating means may calculate the prescribed values using page model extension processing based on the ICDF. Further, when the second generating means calculates both the second weightings in which a prescribed page is taken to be a link source and which is for between link destination pages linked to from the link source, as well as the second weightings in which a prescribed page is taken to be a link destination and which is for between link source pages linking to the link destination, the third generating means may generate both the SDF data and the CDF data, and the calculating means may calculate the prescribed values using page model extension processing based on the ISDF and the ICDF.

The calculating means may also calculate the prescribed values by a calculation using the number of times a prescribed word appears in the prescribed pages and the data generated by the third generating means corresponding to, of pages in a linked relationship, which is generated by the second generating means, pages containing the prescribed word.

There may also be provided storage means for storing the relevance calculated by the second calculating means, and providing means for referring to the relevance stored in the storage means and providing information for pages having high relevance with respect to a prescribed page when provision of information for pages related to the prescribed page is requested.

The providing means may also provide information for advertising relating to the prescribed pages while providing the information.

An information processing method, a computer executable program for realizing the information processing method above, and the computer executable program above stored on a recording medium related to the present invention each comprise: an acquisition step for acquiring data for pages constituting sites; an extraction step for extracting words appearing within the pages using the data for the pages acquired in the acquisition step; a counting step for counting the number of times the words extracted in the extraction step appear within the pages; a first generating step for analyzing the link structure between the pages acquired in the acquisition step, and generating first weightings for between the pages in linked relationships using values of counts obtained in the counting step; a second generating step for generating second weightings for between other pages in linked relationships with a prescribed page using the first weightings generated in the first generating step; a third generating step for generating at least one of SDF data and CDF data using the second weightings generated in the second generating step; a first calculating step for calculating prescribed values using page model extension processing based on at least one of ISDF and ICDF using the data generated in the third generating step; and a second calculating step for calculating, of the acquired pages, the relevance between prescribed pages using the prescribed values calculated in the first calculating step.

An information processing device, method, and program related to the present invention can therefore carry out more precise related page searches using page models based on at least one of ISDF and ICDF.

With an information processing device, method, recording medium and program related to the present invention, sites set up on the Internet can be searched.

In addition, with an information processing device, method, recording medium and program related to the present invention, sites that are closer to what a user desires can be found, and information thereon can therefore be provided.

BRIEF DESCRIPTION OF THE DRAWINGS

FIG. 12 is a view illustrating data stored in a collected site list storage section;

FIG. 13 is a view illustrating data for sites stored in a saved page storage section;

FIG. 14 is a view illustrating data stored in a page ID storage section;

FIG. 15 is a view illustrating data stored in a word ID storage section;

FIG. 16 is a view illustrating data stored in a word ID storage section;

FIG. 17 is a view illustrating data stored in a basic page model storage section;

FIG. 18 is a view illustrating data stored in a link information storage section;

FIG. 19 is a view illustrating data stored in a link relationship information storage section;

FIG. 22 is a view illustrating data stored in a page model extension data storage section;

FIG. 23 is a view illustrating data stored in a relevance data storage section;

FIG. 28 is a view illustrating data stored in a link relationship information storage section;

FIG. 29 is a view illustrating data stored in a CDF data storage section;

FIG. 32 is a view showing another example internal configuration for a search server;

FIG. 33 is a view illustrating data stored in a special settings management data storage section; and FIG. 34 is a view illustrating data stored in a special settings administrator data storage section.

DESCRIPTION OF THE PREFERRED EMBODIMENTS

Figure 1:
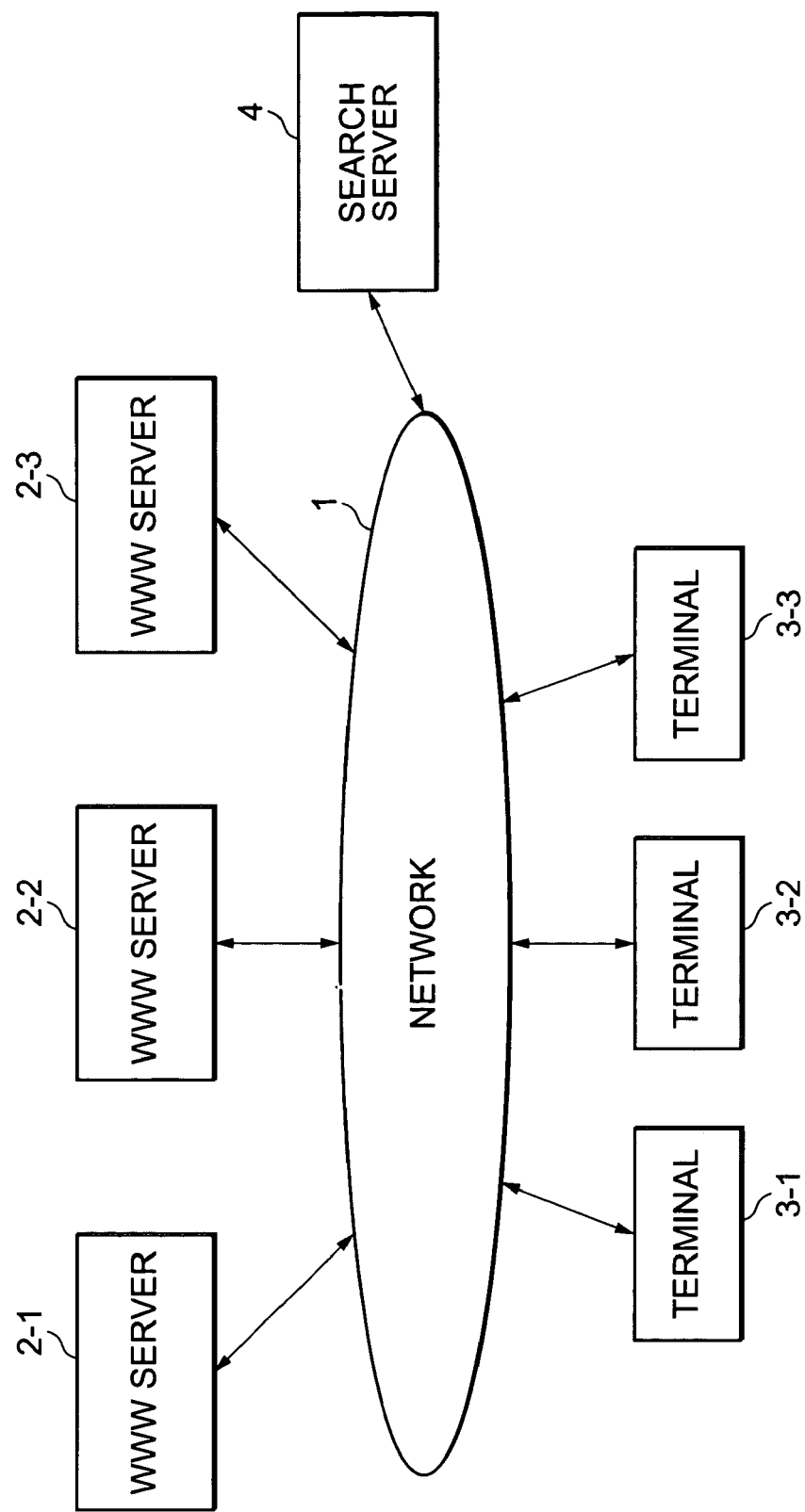
FIG. 1 is a view showing a configuration of an embodiment of an information processing system to which the present invention is applied.

The following is a description of preferred embodiments of the present invention with reference to the drawings. FIG. 1 is a view showing a configuration of an embodiment of an information processing system including an information processing device of the present invention. A network 1 is a network comprising the Internet and a LAN (Local Area Network). WWW servers 2-1 to 2-3, terminals 3-1 to 3-3 and a search server 4 are connected to the network 1 so as to be capable of mutually exchanging data.

In the description below, when it is not necessary to individually distinguish between the WWW servers 2-1 to 2-3, these servers are simply described as "WWW server 2." Other devices are also described in a similar manner. In FIG. 1, only three WWW servers 2, three terminals 3 and one search server 4 are shown for ease of description but a much larger number of devices may actually be connected to the network 1.

The WWW server 2 is a server for managing and providing homepages provided as one service delivered over the Internet. The terminal 3 is a user-side terminal and has a function for viewing homepages provided from the WWW server 2. The search server 4 is a server a user of the terminal 3 connects to when the user wishes to search for pages relating to homepages provided by the WWW server 2, etc., and has functions for searching for information corresponding to user requests and providing results of the searches.

Figure 2:
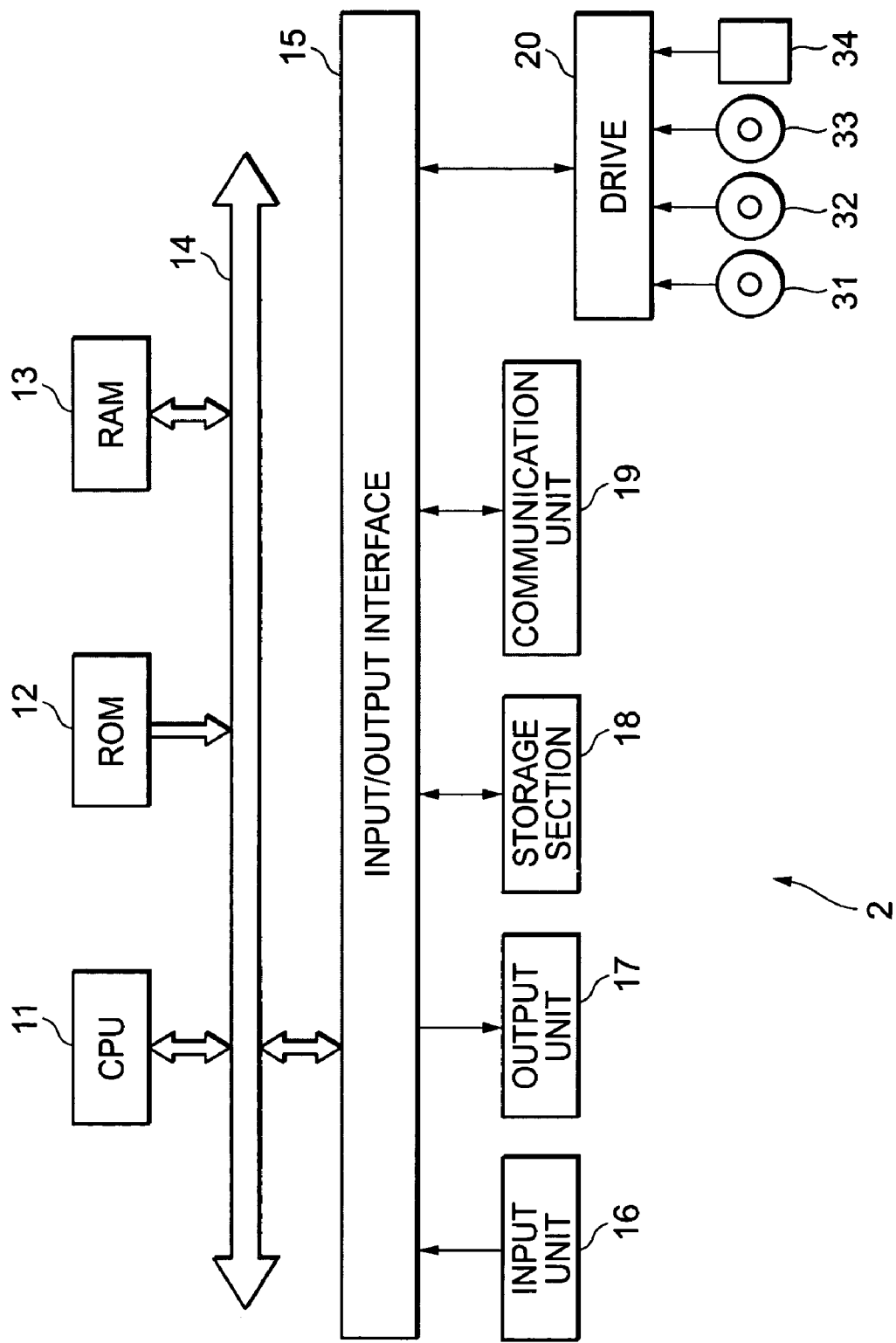
FIG. 2 is a view showing an example internal configuration for a WWW server.

FIG. 2 is a view showing an example internal configuration for the WWW server 2. The WWW server 2 can be configured from a personal computer etc., with a CPU (Central Processing Unit) 11 of the personal computer executing various processes in accordance with a program stored in ROM (Read Only Memory) 12. Data and programs etc. required in various processes executed by the CPU 11 are stored as appropriate in RAM (Random Access Memory) 13. An input unit 16 comprised of a keyboard and mouse, etc. is connected to an input/output interface 15 and signals inputted to the input unit 16 are outputted to the CPU 11. An output unit 17 comprised of a display and speakers etc. is also connected to the input/output interface 15.

A storage section 18 comprised of a hard disc etc., a communication unit 19 for exchanging data with other devices (for example, terminals 3) via the network 1, and a drive 20 are also connected to the input/output interface 15. Data relating to homepages is stored in the storage section 18 and is provided when there are requests for the homepages from other devices. The drive 20 can be used to read out data from recording media such as a magnetic disc 31, an optical disc 32, a magneto-optical disc 33, or a semiconductor memory 34 etc.

Figure 3:
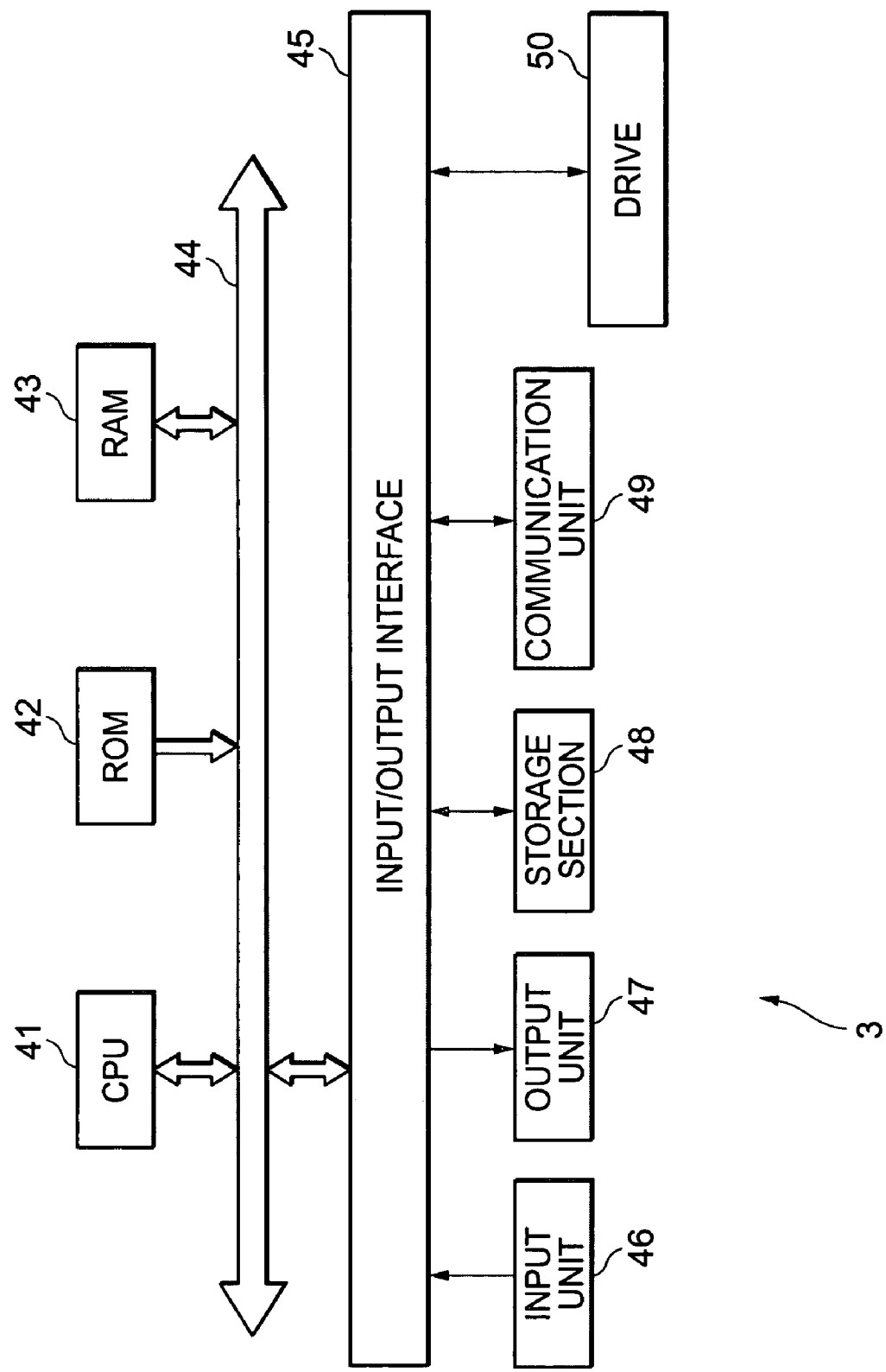
FIG. 3 is a view showing an example internal configuration for a terminal.

FIG. 3 is a view showing an example internal configuration for the terminal 3. The terminal 3 can be configured from a personal computer etc., with a CPU 41 of the personal computer executing various processes in accordance with a program stored in ROM 42. Data and programs etc. required in the various processes executed by the CPU 41 are stored as appropriate in RAM 43. An input unit 46 comprised of a keyboard and mouse, etc. is connected to an input/output interface 45 and signals inputted to the input unit 46 are outputted to the CPU 41. An output unit 47 comprised of a display and speakers etc. is also connected to the input/output interface 45.

A storage section 48 comprised of a hard disc etc., a communication unit 49 for exchanging data with other devices (for example, the search server 4) via a network such as the Internet, and a drive 50 are also connected to the input/output interface 45. Data and software such as a browser required for browsing homepages provided by the WWW server 2 are stored in the storage section 48 and are read and stored in the RAM 43 as necessary.

Figure 4:
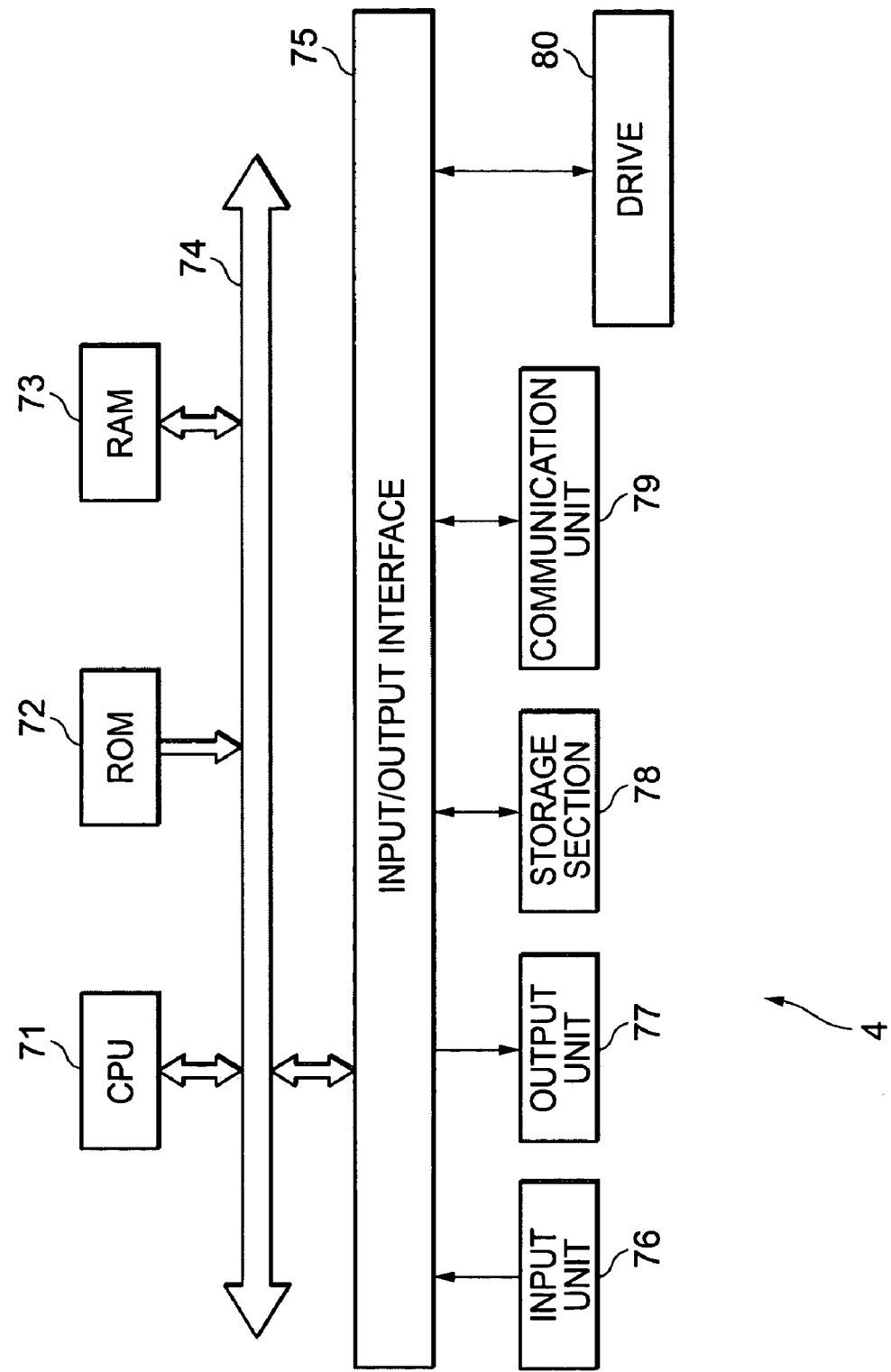
FIG. 4 is a view showing an example internal configuration for a search server.

FIG. 4 is a view showing an example internal configuration for the search server 4. The search server 4 can be configured from a personal computer etc., with a CPU 71 of the personal computer executing various processes in accordance with a program stored in ROM 72. Data and programs etc. required in the various processes executed by the CPU 71 are stored as appropriate in RAM 73. An input unit 76 comprised of a keyboard and mouse, etc. is connected to an input/output interface 75 and signals inputted to the input unit 76 are outputted to the CPU 71. An output unit 77 comprised of a display and speakers etc. is also connected to the input/output interface 75.

A storage section 78 comprised of a hard disc etc. and a communication unit 79 for exchanging data with other devices (for example, the terminal 3) via a network such as the Internet, and a drive 80 are also connected to the input/output interface 75. Data for searching for homepages provided by the WWW server 2 are stored in the storage section 78.

Figure 5:
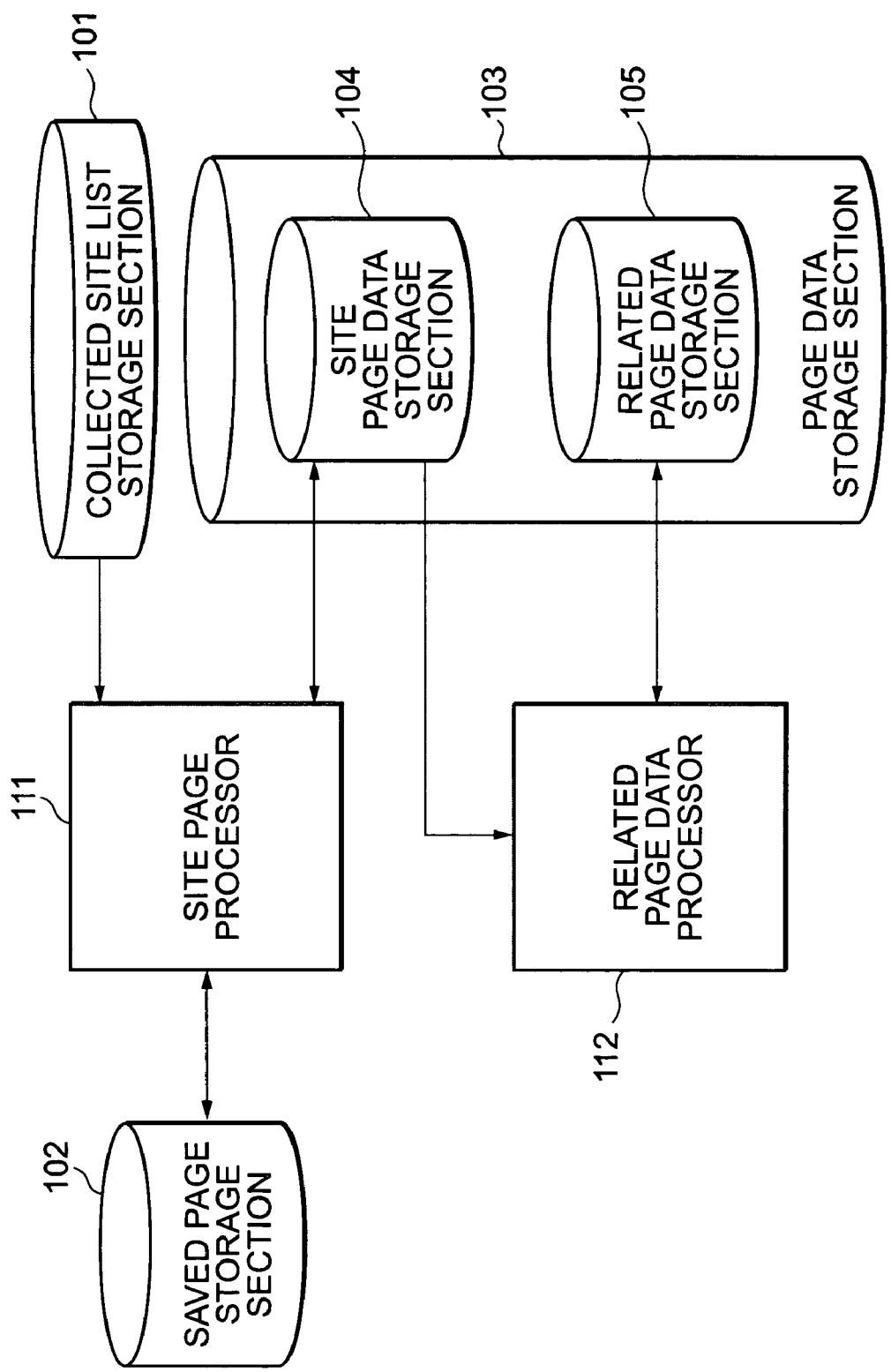
FIG. 5 is a view showing an example internal configuration for a search server.

FIG. 5 is a functional block diagram of the search server 4. The search server 4 is comprised of a storage function for storing data, and a processing function for creating this stored data and executing processes using the stored data. The search server 4 is equipped with, as storage functions, a collected site list storage section 101 for storing lists of homepages (sites) from which data is to be collected, a saved page storage section 102 for storing data of pages for sites collected based on a list stored in the collected site list storage section 101, and a page data storage section 103 for storing processed results of the page data stored in the saved page storage section 102.

The search server 4 is equipped with, as processing functions, a site page processor 111 for processing page data stored in the saved page storage section 102 and a related page data processor 112 for executing prescribed processes using data as results processed by the site page processor 111 and generating data relating to related pages etc.

Data processed by the site page processor 111 is stored in a site page data storage section 104 of the page data storage section 103, and data processed by the related page data processor 112 is stored in a related page data storage section 105 of the page data storage section 103.

Details of the site page processor 111 and the site page data storage section 104 are described with reference to FIG. 6. The site page processor 111 is equipped with a page acquisition storage section 141. The page acquisition storage section 141 executes a process for connecting with sites described in lists stored in the collected site list storage section 101, downloads data for all homepages stored on each of the sites, and stores (saves) this downloaded data in the saved page storage section 102.

Each of the pages stored in the saved page storage section 102 is allotted a unique ID for purposes of identification by a page ID allocation unit 142 and data relating to the allotted IDs is stored in a page ID storage section 161 of the site page data storage section 104.

Pages stored in the saved page storage section 102 are also read by a word extractor 143. The word extractor 143 extracts words included within pages that have been read out. Data for the words extracted by the word extractor 143 is provided to a word ID allocator 144. The word ID allocator 144 assigns IDs to the provided words in order to distinguish these words from other words. Assigned IDs and data for words corresponding to these IDs are stored in a word ID storage section 162 of the site page data storage section 104.

Data from the word ID allocator 144 is also supplied to a basic page model generator 145. The basic page model generator 145 creates data such as the frequency with which the extracted words are used within a page, etc. Data created by the basic page model generator 145 is stored in a basic page model storage section 163 of the site page data storage section 104.

Pages stored in the saved page storage section 102 are also read by a link determination unit 146 of the site page processor 111. The link determination unit 146 determines parent-child relationships for each page. A parent-child relationship for each page is a relationship where, with respect to a prescribed page, when this page is taken to be a parent page, pages which this page then links to are referred to as child pages. Information relating to parent-child relationships between pages determined by the link determination unit 146 is then outputted to a link information storage section 164 of the site page data storage section 104 and stored therein.

Figure 7:
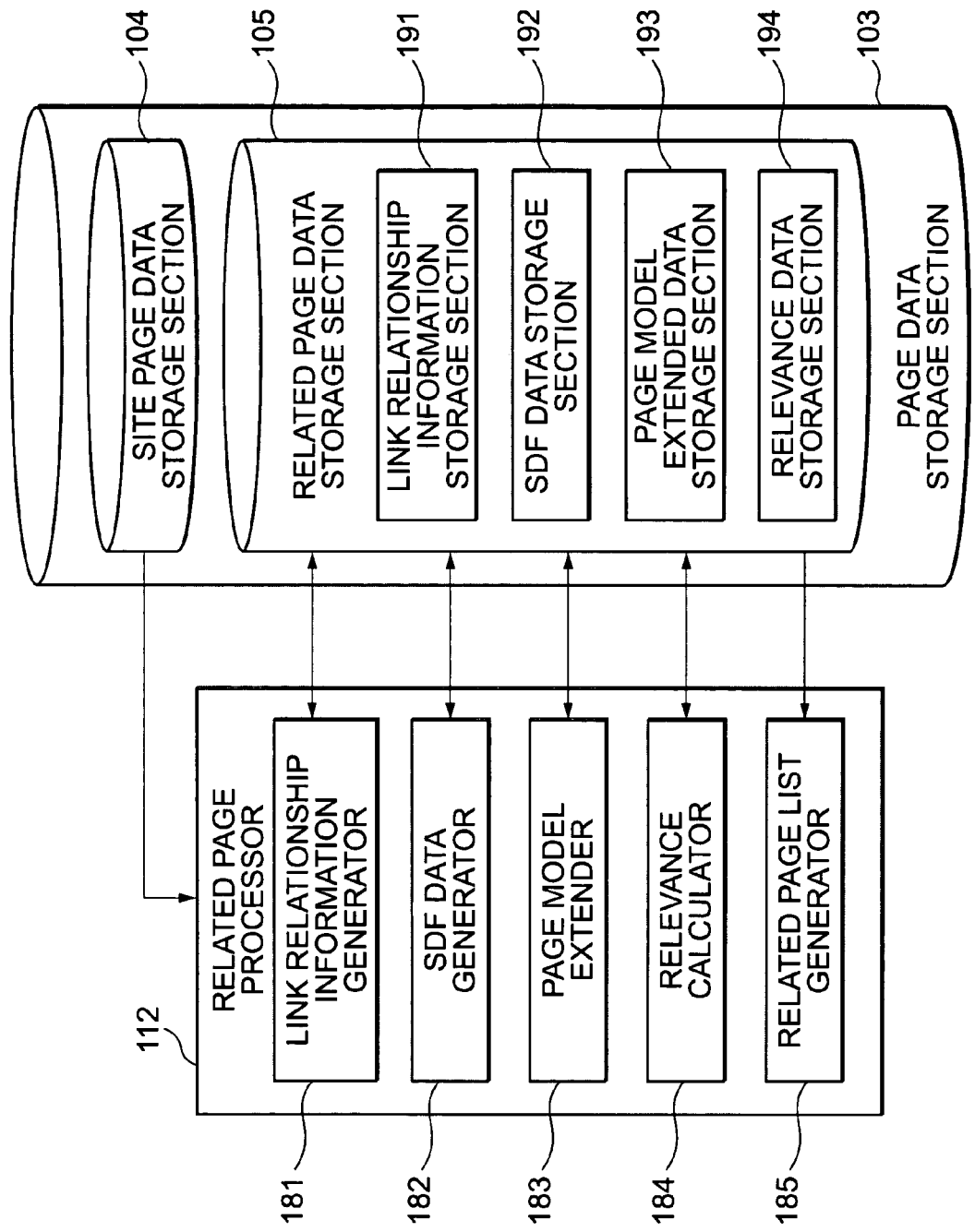
FIG. 7 is a view showing a detailed example of an internal configuration for a search server.

Next, a description of a detailed configuration of the related page data processor 112 and the related page data storage section 105 is given with reference to FIG. 7. The related page data processor 112 executes processes using data stored in the site page data storage section 104 as necessary. First, a link relationship information generator 181 of the related page data processor 112 extracts information for child pages having the same parent using data stored in the site page data storage section 104.

Figure 8:
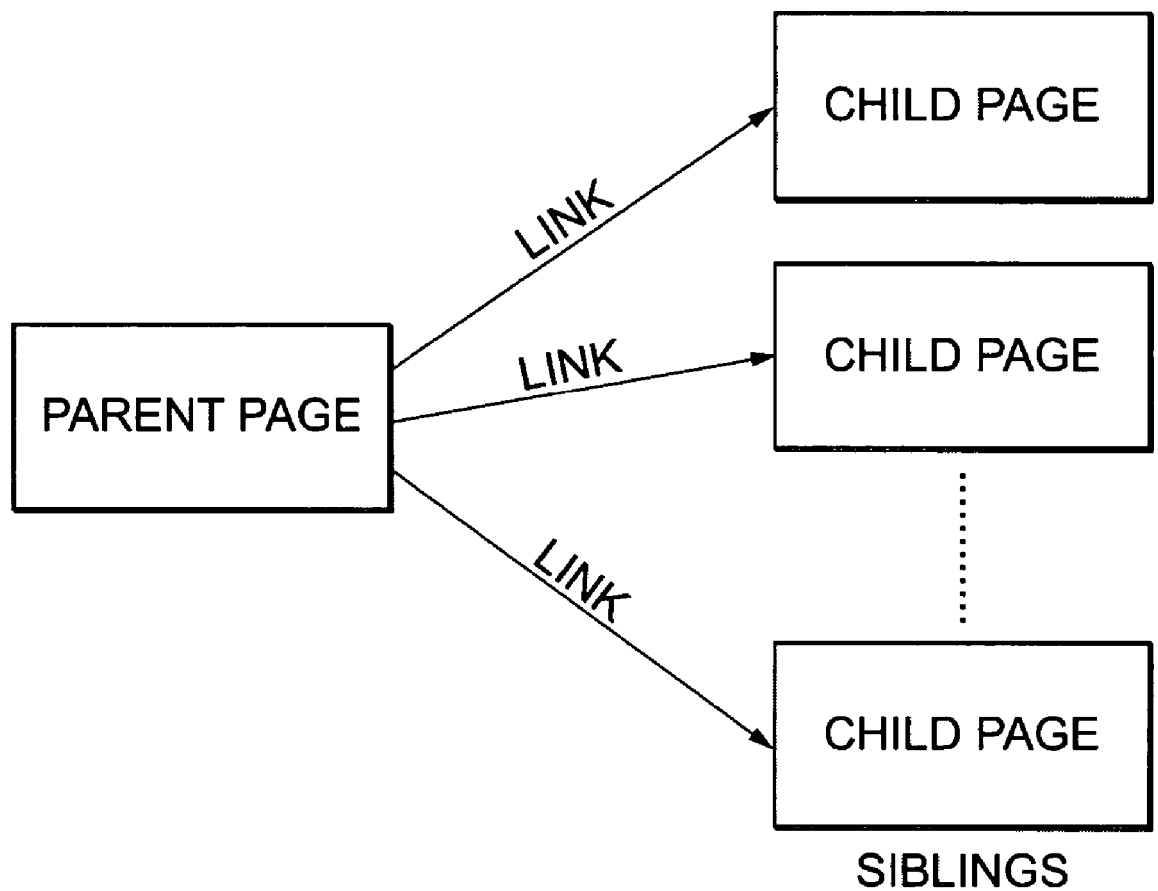
FIG. 8 is a view illustrating link relationships.

Referring to FIG. 8, when a plurality of child pages link to a single predetermined parent page, information for these child pages is extracted. Information for these extracted child pages, i.e. information for pages taken to be siblings, is generated. Information for these pages taken to be siblings is generated at the link relationship information generator 181 and is stored in a link relationship information storage section 191 of the related page data storage section 105.

An SDF data generator 182 of the related page data processor 112 generates SDF data. Here, "SDF" is an abbreviation of "Sibling Document Frequency." Although described in detail below, SDF data generated by the SDF data generator 182 is data that is, with respect to words included in each page (words that appear in each page), the sum total of weightings for links of sibling pages in which those words appear.

SDF data generated by the SDF data generator 182 is stored in an SDF data storage section 192 of the related page data storage section 105. A page model extender 183 of the related page data processor 112 assigns weightings to data stored in the SDF data storage section 192, and provides the data with respect to which this weighting assignment is performed to a page model extended data storage section 193 of the related page data storage section 105.

A relevance calculator 184 of the related page data processor 112 calculates the relevance for each page and stores the results of these calculations in a relevance data storage section 194 of the related page data storage section 105. The relevance calculator 184 calculates relevance based on, for example, the VSM (an abbreviation of "Vector Space Model," also referred to as the "Vector Space Method") cosine similarity.

A related page list generator 185 executes processes such as generating lists of related pages based on data stored in the page data storage section 103 and providing this data to a user when there is an instruction from a user.

Figure 9:
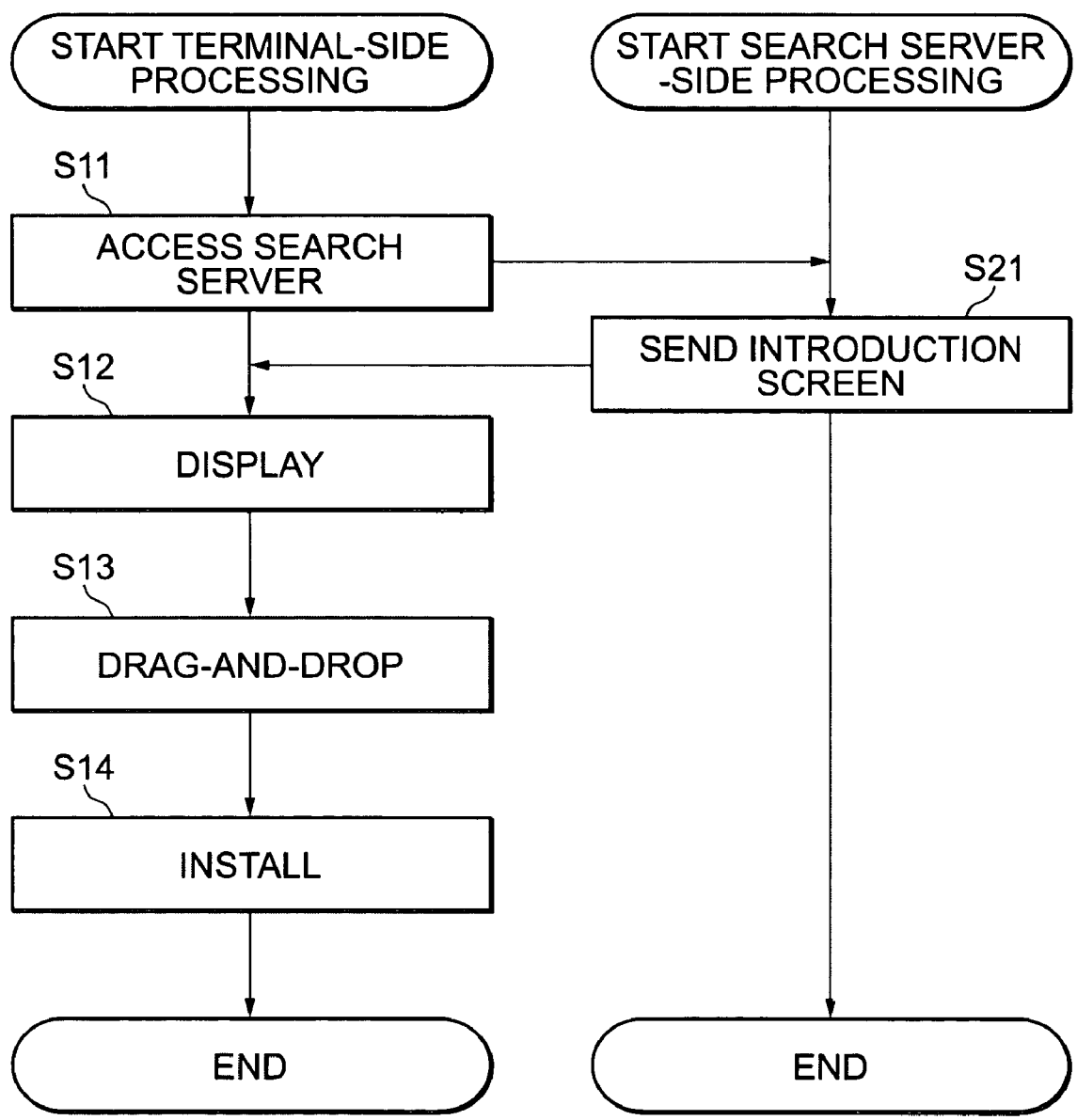
FIG. 9 is a flowchart illustrating a process carried out between a terminal and a search server.

Processes carried out between the search server 4 for generating and storing such data and the terminal 3 is described with reference to the flowchart of FIG. 9. In step S11, the terminal 3 connects to the search server 4 via the network 1. This connection (access) is taken to be when the terminal 3 first connects to the search server 4 or when settings described later have not been carried out at the side of the terminal 3. In other words, this connection is taken to be a different type of connection from the connection established for a user to perform searches using a related page search button 231 (FIG. 10B) described later.

When the search server 4 accepts an access from the terminal 3, in step S21, an introduction screen is sent. An introduction screen is a screen such as, for example, the screen shown in FIG. 10A, and is a screen for configuring in the browser of the terminal 3 buttons etc. operated to perform searches by the search server.

Figure 10A:
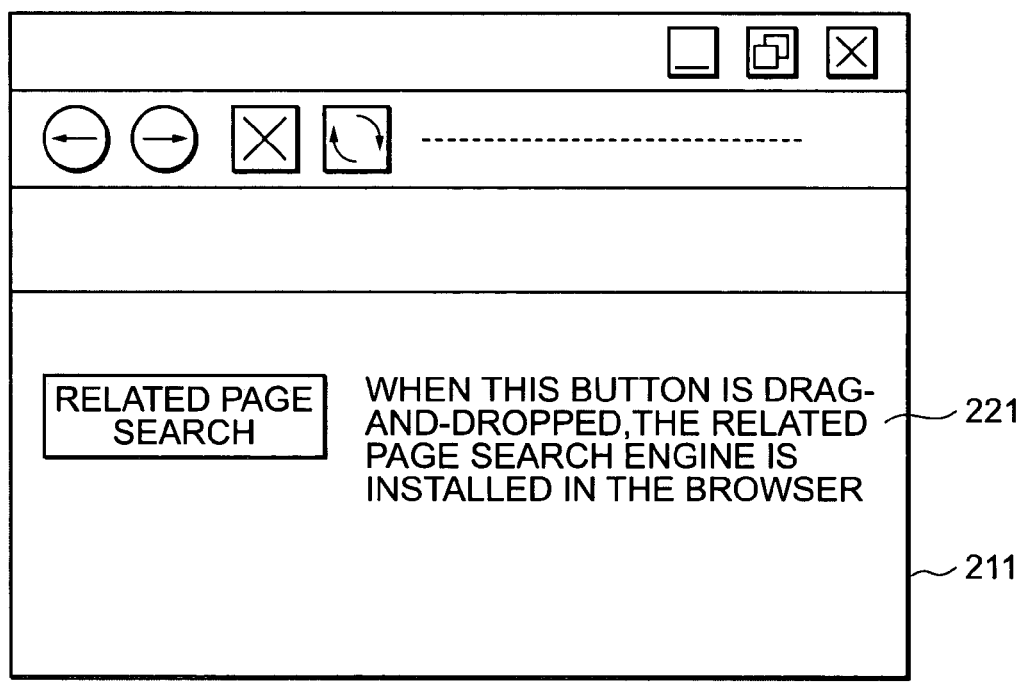
FIG. 10A and FIG. 10B are views showing an example of a screen displayed on a terminal side display.

A program relating to a browser used to exchange data via the network 1 is stored in the storage section 48 of the terminal 3 (FIG. 3) and is activated and used by the CPU 41 in executing processes as necessary. When the browser is activated, and data for the introduction screen is received from the search server 4 and processed by the activated browser, a screen such as the one shown in FIG. 10A is displayed on a display 211 constituting the output unit 47 (step S12).

On the display 211, there is provided an image display section 221 at a lower side of a portion displayed as a result of activating the browser, and the introduction screen from the search server 4 is displayed on the image display section 221. The introduction screen may be, for example, a screen displaying a message like "when this button is drag-and-dropped, the related page search engine will be installed in the browser" together with a button. The user may then, for example, drag-and-drop the button to a prescribed area (usually an area referred to as a "link tool bar") at an upper part of the browser in accordance with this message.

When this drag-and-drop is carried out in step S13, settings corresponding to this drag-and-drop operation are carried out in step S14. Namely, as shown, for example, in FIG. 10B, these settings are displaying.the related page search button 231 corresponding to the drag-and-dropped button at a prescribed portion of the browser, and storing an address for the search server 4 in association with the related page search button 231.

Figure 10B:
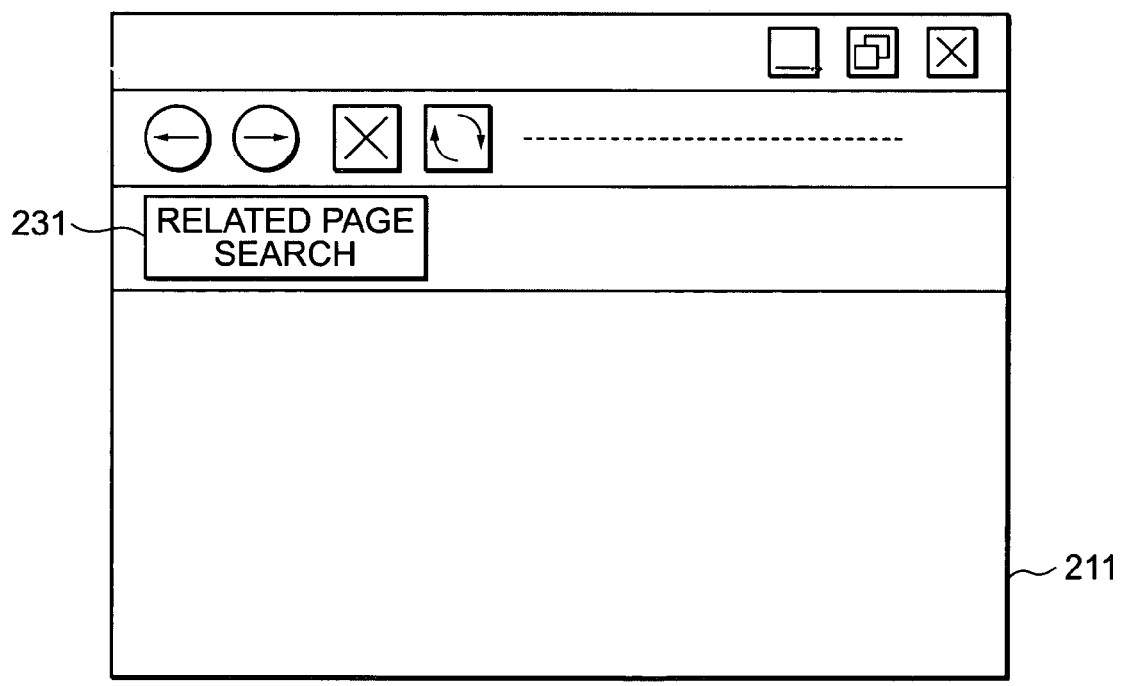

By carrying out these settings, as shown in FIG. 10B, once the related page search button 231 is displayed at a prescribed portion of the browser, a user is now able to utilize searches by the search server 4.

By using the introduction screen, the related page search button 231 may be set in the browser or may be provided as a banner at a prescribed position on a page. Further, it is possible for a user to access the search server 4 and input a URL (Uniform Resource Locator) for a prescribed page. In either case, it is preferable to perform settings in such a manner that when a user wishes to make a search, the search server 4 can be accessed with a simple operation such as clicking a button so that results of searches by the search server 4 can be received.

Figure 11:
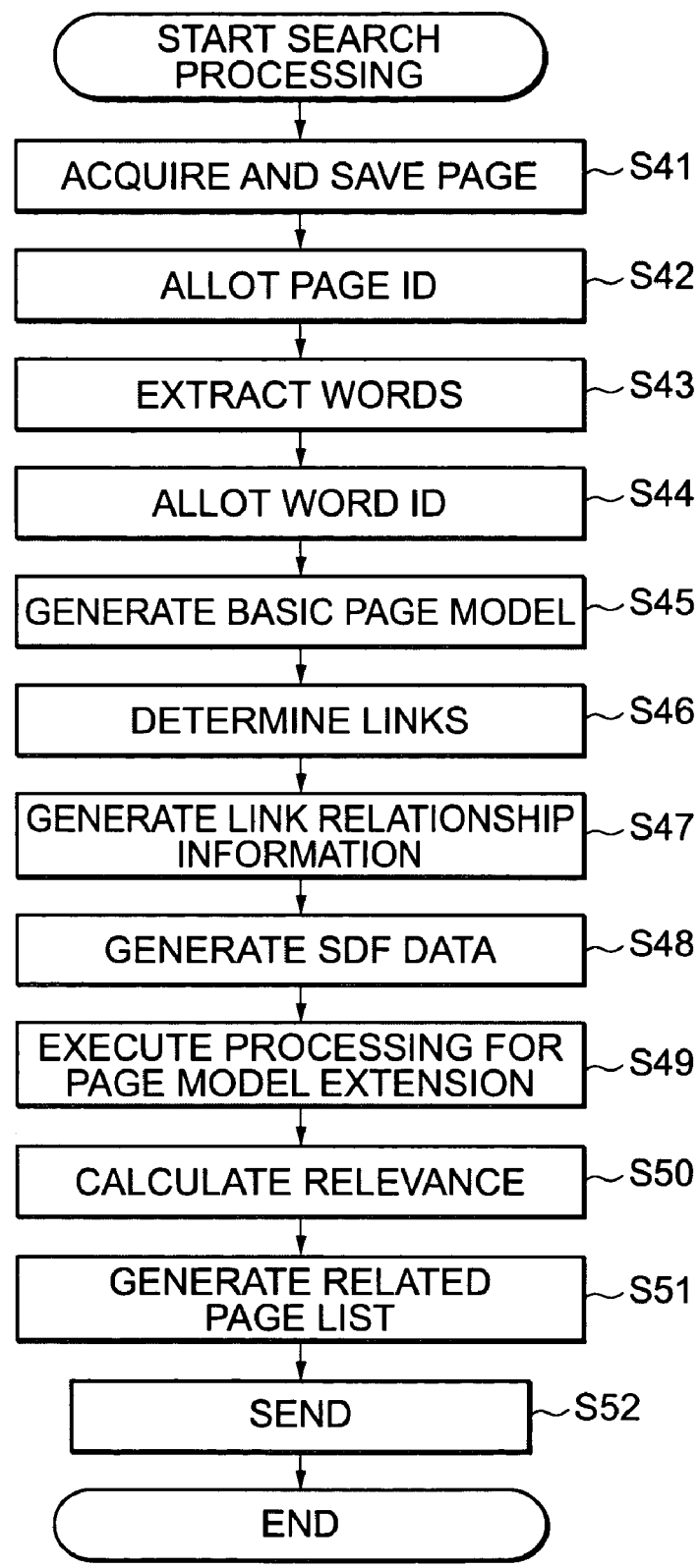
FIG. 11 is a flowchart illustrating the operation of a search server.

A description is now given with the assumption that the related page search button 231 is set in the browser as shown in FIG. 10B. When a user operates the related page search button 231 while browsing, for example, a prescribed page of a homepage provided by the WWW server 2-1 (FIG. 1), information to the effect that the related page search button 231 has been operated, i.e. information that a search has been instructed, is sent to the search server 4. As a result, the process of the flowchart shown in FIG. 11 is started at the search server 4.

In step S41, page data (hereinafter, a description referring simply to a "page" is also taken to refer to page data) of a prescribed homepage (site) is acquired and saved. Pages of homepages are acquired based on lists stored in the collected site list storage section 101. When a prescribed URL sent as a request by a user is not registered in the collected site list storage section 101, this URL is additionally recorded. An example of a list stored in the collected site list storage section 101 is shown in FIG. 12. As shown in FIG. 12, the list stored in the collected site list storage section 101 includes information such as "Collection Start URL," "Included Directory," "Excluded Directory," "Included Domain," and "Excluded Domain."

Pages can be acquired based on this list. Acquired pages are stored in the saved page storage section 102. Information is managed at the saved page storage section 102 per site for acquired pages in the list format shown in FIG. 13. As shown in FIG. 13, such information as "Site ID," "Site Name," and "Total Number of Pages" is included in the list.

The site ID is an ID allotted to a site. An ID may be allotted when the page acquisition storage section 141 acquires information for pages (sites), or may be stored in the kind of list shown in FIG. 12 stored in the collected site list storage section 101 in association with other information stored therein.

When acquired pages are saved in the saved page storage section 102 and prescribed site information is stored, in step S42, IDs are allotted by the page ID allocation unit 142 to each of the pages acquired. The page ID allocation unit 142 reads out pages stored in the saved page storage section 102 and allots IDs to these pages.

In so doing, a list as shown in FIG. 14 is made from the read-out pages and the allotted IDs and is stored in the page ID storage section 161. Such information as "Page ID," "Site ID," "Page URL," "Title," "Summary," "Page Saved At," and "Last Updated" is included in the list stored at the page ID storage section 161 shown in FIG. 14.

Of such information, "Page ID" is allotted by the page ID allocation unit 142 and the other information is stored in the saved page storage section 102 and is extracted from the data for read-out pages.

In step S43, words included within pages are extracted by the word extractor 143. This extraction of words is carried out by having one page of the saved pages read-out from the saved page storage section 102 and by having words included in this page extracted by the word extractor 143. Words classified as nouns are extracted. However, it is also possible to extract words classified as adjectives or nouns etc. or to extract English words, etc. The words extracted by the word extractor 143 may be any category of words required in subsequent processing (words that are necessary for ensuring that results provided to the user by the search server 4 as the final search results are favorable).

Extracted words are provided to the word ID allocator 144. Not only the extracted words, but also the number of times the words appear, a page ID, each word provided with tags, and the number of times these words provided with tags appear are provided to the word ID allocator 144. The word extractor 143 reads and supplies this information from the page ID storage section 161 or the saved page storage section 102 as necessary.

The word ID allocator 144 allocates IDs to the words provided. The words that are allocated IDs are associated with the IDs and are stored as such in the word ID storage section 162. For example, the list shown in FIG. 15 is stored in the word ID storage section 162.

As shown in FIG. 15, "Word ID" and "Word" are stored in the word ID storage section 162 so as to correspond with each other. The same ID can be allotted when the same word is extracted. To this end, the word extractor 143 determines whether or not an extracted word is a word already stored in the word ID storage section 162. When the word is a word that is already stored, control is exerted so that a new ID is not allotted.

The word ID allocator 144 then makes a list such as that shown in FIG. 16 and stores this list in the word ID storage section 162. The list shown in FIG. 16 contains such information as "Word ID," "Site ID," "Number of pages including the word within the site," "IDs of pages including the word within the site." Given a prescribed single site, the list shown in FIG. 16 shows the correlation with prescribed words included in this site.

The word ID and the word to which this word ID is allotted are supplied to the word ID storage section 162 and a portion of the data is also provided to the basic page model generator 145. In step S45, the basic page model generator 145 generates a basic page model. A basic page model is data such as those shown in FIG. 17 and is list format data stored in the basic page model storage section 163. In order to make this data, page IDs and information relating to the respective word IDs and their number of appearances are supplied to the basic page model generator 145 from the word ID allocator 144,.

As shown in FIG. 17, the list stored in the basic page model storage section 163 contains such information as "Page ID," "Words Appearing," "Title," "Keywords," and "Description." This list includes information showing how many times a single word appears (is used) in a single page, and contains information classified by type such as "Title." It is conceivable that this information classified by type may have different importance depending on each portion the word is used in (or on the type) in ultimately deciding related pages and this information is used when cases where weightings are applied depending on such differences in importance are taken into consideration.

In step S46, as described with reference to FIG. 8, the link determination unit 146 determines a parent page and child pages to which the parent page links and stores the results of these determinations in the link information storage section 164. Information stored in the link information storage section 164 is, for example, information such as that shown in FIG. 18.

As shown in FIG. 18, the list format information stored in the link information storage section 164 contains such information as "Page ID," Link Destination Page ID," "Link Weighting," and "Words Within Anchor Window." "Page ID" and "Link Destination Page ID" indicate the correlation between a parent page and a child page. The link determination unit 146 reads data from the saved page storage section 102, the page ID storage section 161, and the basic page model storage section 163 as necessary in order to make this information.

"Link Weighting" is calculated as described below. When calculating weighting, the degree of relevance between pages is considered to be higher the more a word within an anchor window can be found in a link destination page (in this case, a child page) and the weighting is increased accordingly. In addition, since the importance of a single link can be considered to be lower when a link source page (i.e. a parent page) has a larger number of links, the weighting of links from such a link source page to a child page is made smaller.

A weighting Wc(p,q) of a link from a parent page p to a child page q is calculated based on the following equation (1).

$$Wc(p,q)=1+Npq(\text{Tan } c) \times 1/k \tag{1}$$

In Equation (1), p,q ∈ P (where P is a page set). Further, Npq(Tanc) takes a set of words within an anchor window within a parent page p as set (Tanc), and expresses the number of appearances of this set (Tanc) within a child page q. Here, Tanc ∈ Tall, where Tall is a set of all the words.

Further, k is the number of links possessed by the parent page p, with k always being set to a number equal to or greater than one since it includes links from page p to page q. Adding 1 to the first term of the right side of equation (1) is to ensure that the calculated weighting Wc(p,q) does not become less than 1.

The weighting Wc(p,q) may be calculated in this manner, or Wc(p,q) may be calculated giving weightings to words appearing within the anchor window in accordance with the distance from an anchor as the center. When Wc(p,q) is calculated by assigning weighting according to the distance from an anchor as the center, then Npq(Tanc) in equation (1) is calculated based on the following equation (2).

$$Npq(\text{Tan } c) = H(\text{Dis}(t1)) \times Tc(t1) + H(\text{Dis}(t2)) \times Tc(t2) + \ldots + H(\text{Dis}(tk)) \times Tc(tk) \quad (2)$$

In equation (2), tk ∈ Tanc, and Dis(tk) indicates the distance from an anchor tag to where word tk appears, where it takes on a value of $0 \leq \text{Dis}(tk) \leq D_{max}$. Dmax is the maximum width of one side of an anchor window. Further, H(Dis(tk)) expresses weighting for Dis (tk), and is a value within a range of $0 < H(\text{Dis}(tk)) \leq 1$, where H(0)=1. Tc(tk) expresses the number of appearances of word tk within a child page q.

In this way, weightings may also be assigned taking into consideration the distance from an anchor window. It is also possible to assign weightings to the number of appearances of a word within an anchor window or to the number of appearances of a word within a link destination page (child page) taking into consideration the assignment of weightings in accordance with the type of tag. It is also possible to not assign these weightings and simply make Wc(p,q)=1.

In this way, "Link Weighting" within the list stored in the link information storage section 164 shown in FIG. 18 is calculated. Returning to the description of the flowchart of FIG. 11, in step S47, the generation of link relationship information is carried out by the link relationship information generator 181 (FIG. 7). Information generated by the link relationship information generator 181 is stored in the link relationship information storage section 191 (FIG. 7) in the kind of list format shown in FIG. 19. The link relationship information generator 181 acquires information for making the kind of information shown in FIG. 19 from the link information storage section 164.

As shown in FIG. 19, "Page ID," "Sibling Page ID," and "Link Weighting" are stored in a correlated manner at the link relationship information storage section 191. Here, sibling pages are child pages having common parent pages, and indicate pages having a sibling relationship, as described with reference to FIG. 8.

With respect to each of the page IDs, the link relationship information generator 181 carries out processing to extract page IDs for pages having sibling relationships, and calculates weightings for links between sibling pages. The calculation of weightings for links between sibling pages is carried out as follows. Namely, a weighting Ws(r,s) for links between sibling pages is calculated based on the following equation (3).

$$Ws(r,s) = Wc(t,r) \times Wc(t,s) \quad (3)$$

In equation (3), r, s, t are values fulfilling r, s, t ∈ P where P is taken to be a page set, and Ws(r,s) is a value fulfilling $1 \leq Ws(r,s)$.

In equation (3), Ws(r,s) is a weighting for a link between a prescribed page r and a sibling page s having a sibling relationship with the page r, Wc(t,r) is a weighting for a link between a prescribed page t and a child page r having a parent-child relationship with the page t, and Wc(t,s) is a weighting for a link between the prescribed page t and the child page s having a parent-child relationship with the page t.

Figures 20, 21:
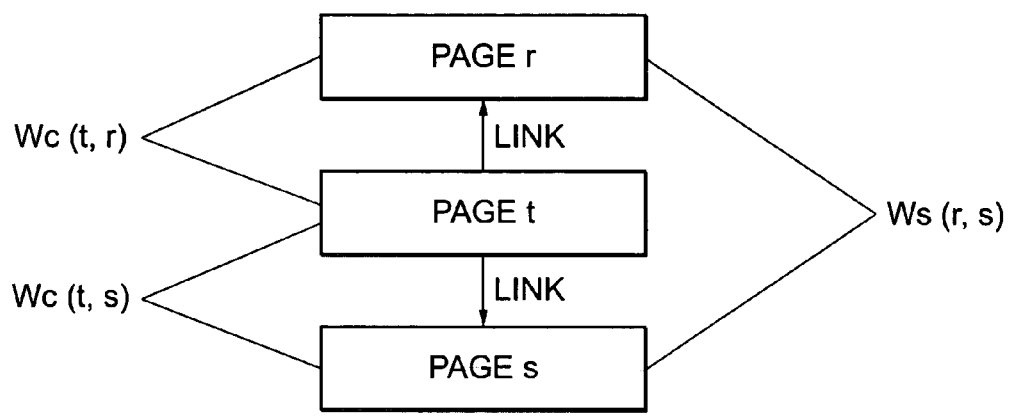
FIG. 20 is a view illustrating the calculation of weighting.
FIG. 21 is a view illustrating data stored in an SDF data storage section.

With reference to FIG. 20, equation (3) expresses the fact that a weighting Ws(r,s) for a link between the prescribed page r and the page s having a sibling relationship with this page r can be obtained by multiplying weightings for links between pages existing within this sibling relationship, which in this case are weightings between pages r and s and the parent page t in a parent-child relationship with both pages r and page s. In other words, the weighting Ws(r,s) in this case is obtained by multiplying the weighting Wc(t,r) with the weighting Wc(t,s).

Weightings of links between sibling pages are thus calculated, and the results of these calculations are then written as the list format data such as the data shown in FIG. 19.

Returning to the description of the flowchart of FIG. 11, in step S48, the generation of SDF data is carried out by the SDF data generator 182 (FIG. 7). The SDF data generator 182 reads data out from the link relationship information storage section 191 and the basic page model storage section 163 as necessary, makes data of the list format shown in FIG. 21 using this read-out data, and stores this data in the SDF data storage section 192.

The data stored in the SDF data storage section 192 shown in FIG. 21 contains such information as "Page ID," "Word ID included in the Page ID," and "Sum Total of Weightings of Links for Sibling pages containing this Word ID." This data is data in which, with respect to words that appear in each of the pages, the weightings for links for sibling pages in which the words appear are totaled. When the link determination unit 146 generates a link weighting of Wc(p, q)=1, this data will simply indicate the total number of sibling pages in which the word appears.

In step S49, the page model extender 183 (FIG. 7) executes page model extension processing. Page model extension processing is processing where a list format data such as the data shown in FIG. 22 is made and is stored in the page model extended data storage section 193. The page model extender 183 reads out data stored in the basic page model storage section 163, the link information storage section 164, the link relationship information storage section 191 and the SDF data storage section 192 as necessary in order to make data like the data shown in FIG. 22.

The data shown in FIG. 22 stored at the page model extended data storage section 193 contains such information as "Page ID" and "Vector." A weighting within "Vector" can be obtained as shown below based on ISDF (Inverse Sibling Document Frequency).

$$Pi = (\{Ti1 \times Wi1\}, \{Ti2 \times Wi2\}, \ldots, \{Tij \times Wij\}, \ldots) \quad (4)$$

In equation (4), i is a page, i ∈ P, j is a word, and j ∈ Tall. Pi indicates a Tall dimension vector of page i. Tij is a value indicating whether or not word j appears in page i, and is set to 1 when the word appears, and to 0 when the word does not appear.

Wij is the weighting of word j in page i and is calculated based on equation (5) below. Further, Wij is a value satisfying $0 \leq Wij$, and is normalized so that $\Sigma(Ti \times Wij)^2 = 1$ (i.e., so that the sum total of squared values of values arrived at by multiplying Ti and Wij is 1).

$$Wij=(1+\log(TFij))\times(1+\log(1/(1+SDFij))) \quad (5)$$

In equation (5), TFij expresses the number of appearances of word j in page i, and assumes a value of $0 \leq TFij$. SDFij indicates the sum total of weightings of links to pages including word j of the sibling pages of page i.

While it is possible to calculate weighting within vectors using equation (4) and equation (5), it is also possible to substitute equation (6) for equation (5) in order to enhance the effects of SDFij.

$$Wij=(1+\log(TFij))\times(1+\log(1+ASDFi/(1+SDFij))) \quad (6)$$

In equation (6), ASDFi indicates the sum total of the weightings of links between page i and all sibling pages.

Further, TTFij and ATFij may be added, and weighting may be calculated based on the following equation (7) which is based on equation (5), or based on the following equation (8) which is based on equation (6).

$$Wij=(1+\log(TFij+TTFij+ATFij))\times(1+\log(1/(SDFij))) \quad (7)$$

$$Wij=(1+\log(TFij+TTFij+ATFij))\times(1+\log(1+ASDFi/(1+SDFij))) \quad (8)$$

In equations (7) and (8), TTFij indicates whether or not word j provided with a tag appears on page i, and is set to 0 when it does not appear, and to 1 when it does appear. Alternatively, TTFij may also be set to the number of appearances (0 or greater). It is also possible to assign weightings according to the type of tag.

Further, ATFij indicates whether or not word; appears within an anchor window of the link source page (in this case, a parent page) of the page i, and is set to 0 when the word does not appear, and to 1 when the word does appear. Alternatively, ATFij may also be set to the number of appearances (0 or greater). Weighting may also be provided as with tagged words. It is also possible to assign weighting according to the distance from an anchor.

"Weighting" data for each word within "Vector" within the data shown in FIG. 22 is calculated based on such equations. Returning to the description of the flowchart of FIG. 11, in step S50, the relevance between pages is calculated at the relevance calculator 184. The relevance calculator 184 reads data stored in the page model extended data storage section 193 as necessary, makes list format data like the data shown in FIG. 23 and stores this in the relevance data storage section 194.

The data shown in FIG. 23 stored in the relevance data storage section 194 contains such information as "Page ID," "Target Page ID," "Relevance," and "High Relevance Words." Of these, relevance is calculated as described below. Relevance is calculated based on the idea that relevance is higher when there are more portions with common features between pages that have features extracted in a manner that is better suited for related page searches. For example, relevance can be calculated using "number of common features"/"total number of features" (product/sum), or using VSM cosine similarity, etc.

Specifically, relevance is calculated based on equation (9) below. Equation (9) is based on VSM cosine similarity.

$$R(i,j)=Pi \cdot Pj/|Pi| \, \| \, |Pj| \quad (9)$$

In equation (9), Pi, Pj are vector representations of page i and page j, and are values calculated (expressed) using equation (4). Further, $i,j \in P$ holds true. R(i,j) is the relevance of page j with respect to page i, and in FIG. 23, page i is "Page ID," and page j is "target page ID."

Relevance calculated in this manner is stored in the relevance data storage section 194 as data within the kind of list format data shown in FIG. 23. Next, processes from step S51 onwards are carried out, and these processes are carried out using data stored in each storage section as described above, and in particular are carried out using the data stored in the relevance data storage section 194.

The processing up to this point, i.e. processing from steps S41 to S50, may be executed in real time when there are requests from a user or may be executed in advance regardless of requests from users.

When the processing of steps S41 to S50 is carried out regardless of user requests, data may be acquired periodically from prescribed sites, and data stored in each storage section may be updated. If data is made in advance in this way, as compared to executing processing in real time after there has been a user request, it is possible to, when there is a user request, handle the request more immediately.

When data is made in advance in the manner described above but a URL sent at the time a user makes a request does not exist in the data made in advance, it is possible to carry out step S41 to step S50 for pages indicated by this URL or for the site of this page.

In step S51, the related page list generator 185 makes a list of related pages corresponding to the page for which the user has instructed the provision of related pages. The making of the list is carried out as follows.

First, the related page list generator 185 reads a page ID corresponding to a URL of the page that was browsed by the user when operating the related page search button 231 (the page designated by the related page search) from the page ID storage section 161. Data that takes the read-out page ID as Key 1 is then read from the relevance data storage section 194 (FIG. 23). In so doing, the data is sorted in descending order of relevance, and a page ID corresponding to this relevance (page ID that is to be key 2) is read out.

The related page list generator 185 then verifies the page ID at the page ID storage section 161, extracts information relating to this page such as its URL etc., and generates list data.

When generating the list data, the process may be terminated with the data obtained through the processes up to this point, or the following functions may further be added. A list is made so that information relating to pages is displayed to a user in descending order of relevance. However, this presents the problem of which pages to display with priority in cases where, for example, a plurality of pages have the same relevance. It is also conceivable that the degree of importance, which bears no relation to relevance, of pages may be taken into consideration and related pages may then ultimately be displayed to users.

Rankings are then assigned to pages with respect to the relevance calculated by the relevance calculator 184, and this data is added to the final relevance values. For example, the assignment of rankings to pages may be achieved by the search server 4 itself by giving it a rank assigning function or information for assigning rankings provided by another server may be cited.

Specifically, adjustments using parameters may be considered for the calculation of relevance in which data for assigning rankings is taken into consideration.

$$R'(i,j)=pR(i,j)+(1-p)G(j) \quad (10)$$

In equation (10), R' (i,j) is the ranked relevance of page j with respect to page i, and R(i,j) is the relevance of page j with respect to page i, and is a value calculated using equation (9). Further, G(j) is the rank of page j, and p is a parameter having a value of $0 \leq p \leq 1$. The ranked relevance calculated using equation (10) may also be stored in the relevance data storage section 194 as data in the kind of list format data shown in FIG. 23 described previously.

In step S49 of the embodiment described above, a page model taking into consideration the link destination page may be created as a process before or after the process carried out by the page model extender 183. Specifically, a sum total for the basic page models of the link destination is added to the basic model of a prescribed page. In this case, it is also possible to add the weighting for between links calculated by the link determination unit 146 described above. Calculations down to the lowermost layer (leaf) are carried out or up to the Nth link destinations are taken into consideration.

In the case of implementing this function before the page model extender 183 carries out processing using ISDF, the types of words existing in the page model for a prescribed page will increase and the ISDF results will therefore be influenced. It is preferable to decide upon whether to execute processing before or after taking this fact into consideration.

Further, in the above embodiment, it is also possible to carry out processing taking into consideration the relevance of words when carrying out each process. For example, a dictionary (relevance dictionary) where such words as "travel" and "overseas" are made to correspond with each other is provided, and processing is carried out by referring to this relevance dictionary. When a relevance dictionary is not provided, relevance is determined based only on words appearing within a page. Alternatively, when a relevance dictionary is provided, for example, the relevance dictionary may be referenced as a process before executing processing by the basic page model generator 145, the SDF data generator 182, or the relevance calculator 184, etc. and relevance may be calculated using the results of referring to the relevance dictionary. A relevance dictionary may be made based on co-occurrence information or the key graph technique, or ODP (abbreviation of "Open Dictionary Project") category information can be utilized as a relevance dictionary.

Returning to the description of the flowchart of FIG. 11, in step S52, the list data generated in this manner is transmitted to the terminal 3 via the network 1. A list of related pages is then provided to the user at the terminal 3 by processing this list data. This list of related pages may be displayed on the display 211 of the terminal 3 in a window different from the window that is already open (the window in which the related page search button 231 is operated) or may be displayed in the window that is already open.

Here, a description is given of related pages provided to the user as results of a search by the search server 4. For example, in the case of related pages for a prescribed page searched using conventional methods, similar pages are displayed with priority. For example, when a biography page on some musician's site is being browsed, if a page relating to this page is searched, biography pages for the musician found on other sites are provided to the user as search results.

However, in the case of this example, it is possible that the user may obtain no new information by browsing the same biographical information for the same musician on a different site. In other words, rather than browsing the same biography of a particular musician a number of times, a user is likely to desire information such as information relating to the musician's biography, for example, information relating to events participated in in the past, information relating to stories told in the biography, or information relating to what the musician likes, etc. and it is likely that the user executed a related page search in order to obtain such information. Namely, it is likely that, in executing a search, rather than wishing to see similar pages containing the same information, a user would wish to refer to pages that instead bear some relation to a particular page. It is possible to provide such pages as described above that are related but not similar through searches using the search server 4 described above.

Figure 24:
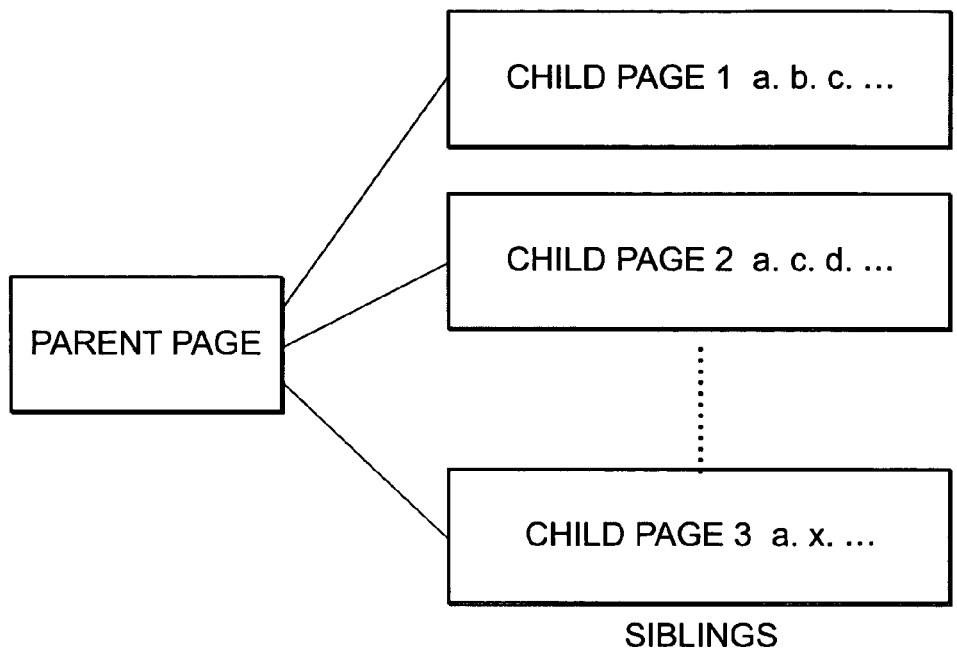
FIG. 24 is a view illustrating the extraction of features between related pages.

The processing of the search server 4 described above is now described with reference to FIG. 24. As shown in FIG. 24, for a parent page, there exist child pages 1 to 3 to which the parent page links. It is assumed that words contained in child page 1 (words extracted in the processing of step S43) are "a, b, c, . . . ," words contained in child page 2 are "a, c, d, . . . ," and words contained in child page 3 are "a, x, . . ."

Under these conditions, word a is common to child pages 1 to 3. For example, for purposes of illustration, it is assumed that there is a page describing suggested uses for product A on a homepage for the product at a site run by a prescribed company. It would be highly likely in this case that word a indicating the name of product A would be found on this page. It can therefore be considered inappropriate for word a to be taken as a word indicating a characteristic feature of these pages (as a word that differentiates a page from other pages).

Words that are common to a plurality of pages such as word a are not treated as words indicating characteristic features of these pages. In other words, in the extraction of features of pages for determining the relevance between pages, words common to a plurality of pages, such as word a, are made to have lower importance compared to other words (other words are set with more substantial weightings).

The setting of weighting in this embodiment, as described above, is carried out based on ISDF (Inverse Sibling Document Frequency). The assigning of weighting based on ISDF is carried out by the page model extender 183 (FIG. 7) as the processing of step S49 as described above.

TF-IDF (Term Frequency-Inverse Document Frequency) is a conventional method of assigning weighting. The reason TF is used in assigning weighting is because it is thought that words used repeatedly in a document (on a prescribed page) are of an important concept within this page. However, words that are used frequently within a page are often common or general purpose words that do not point out features of the page, and are therefore often not appropriate as index words. Therefore, in the TF-IDF method, using IDF, the extent to which a word possesses specificity is reflected in the weighting assigned.

With IDF, weightings of words appearing in a large number of documents of a prescribed data set become smaller. It is therefore possible to outline features of pages within a prescribed data set with more clarity.

In this embodiment, a method referred to as ISDF is employed as opposed to the IDF of this TF-IDF. Weighting is therefore assigned in this embodiment using a method referred to as TF-ISDF. This differs from TF-IDF technique in that document sets of a prescribed relationship (in this case, pages in a sibling relationship) are considered to be a single data set, with IDF then being applied.

Namely, that which is considered to be a common data set is different. In this embodiment, documents (pages) that have a sibling relationship are considered to be a single data set. Pages in this sibling relationship are in a relationship where they all share a common link source page. The fact that the pages are in a relationship where they share a common link source page may indicate that there is some kind of relationship or some kind of point of similarity (common point) between these pages.

It is therefore possible to consider differences between these similar pages in a more specific manner by considering a page set with similar points (common points) to be one data set and assigning weighting (carrying out processing based on ISDF). In this way, it can therefore be considered that the features of each page can be made more specific in a manner better suited for performing related page searches.

In other words, by appropriately defining what is to be considered unnecessary features (noise) and eliminated, it is possible to reduce the weighting of words contained in similar documents and make other features of these documents (pages) stand out. It is therefore possible to perform the assignment of weighting (extraction of features) for pages that is for obtaining relevance rather than similarity by making other features stand out in this manner.

That is to say, IDF of TF-IDF considers words used in common in pages within a certain data set to be unnecessary features, and has been used as a page feature extraction method suited for conventional search engines which return search results when keywords are inputted for it clarifies the features of each page. However, ISDF of TF-ISDF considers page sets in sibling relationships having points of similarity as data sets, and can be said to be a feature extraction method applicable to related page searches for it considers words used in common within these pages as unnecessary features.

Using such weighted results, relevance can be calculated, for example, based on VSM cosine similarity and the like. The calculation of relevance is carried out in the embodiment described above by the relevance calculator 184. To describe VSM briefly, in VSM methods, whether or not certain words appear or the number of appearances is taken as feature quantities, and search target data and inputted documents are expressed using vectors of the number of dimensions of all words. In VSM, the cosine between vectors is often used in order to calculate the similarity (degree of commonality) between data. Methods using VSM are methods that are effective for making models of relationships between articles and vocabulary, of relationships between articles, and of relationships between words.

In this embodiment, in order to assign weightings as described above, calculate relevance, and provide information on related pages to a user using the calculated relevance, for example, when browsing a biography page within a site of a given musician, if a page relating to this page is searched for, rather than providing pages of the same biography within other sites for this musician as search results to the user, information such as information relating to events this musician participated in in the past, information relating to stories told in the biography, or information relating to what the musician likes is provided to the user.

Therefore, according to this embodiment, related pages desired by a user can be provided with a higher degree of accuracy.

On the other hand, means for extracting features of pages using sibling relationships of pages or using co-parent relationships described in detail later may be applied to user model generating techniques using prescribed pages in the user's browsing history. In other words, in generating user models, page sets browsed by the user in the past are often analyzed, but page feature extraction means taking into consideration pages having sibling or co-parent relationships described in the present embodiments may be utilized as the page feature extraction means for the pages. Further, the page feature extraction means may also be applied to search engines which take keywords or natural language as input, and search engines based on page models that take into consideration sibling relationships or co-parent relationships may thus be realized.

In the aforementioned embodiment, the link determination unit 146 (FIG. 6) focuses on a parent page, determines other child pages linked to from the parent page, and processing is carried out in the later stages using these results. However, it is also possible to focus on a child page, determine other parent pages that the child page links to, and then carry out processing in the later stages using these results.

Figure 25:
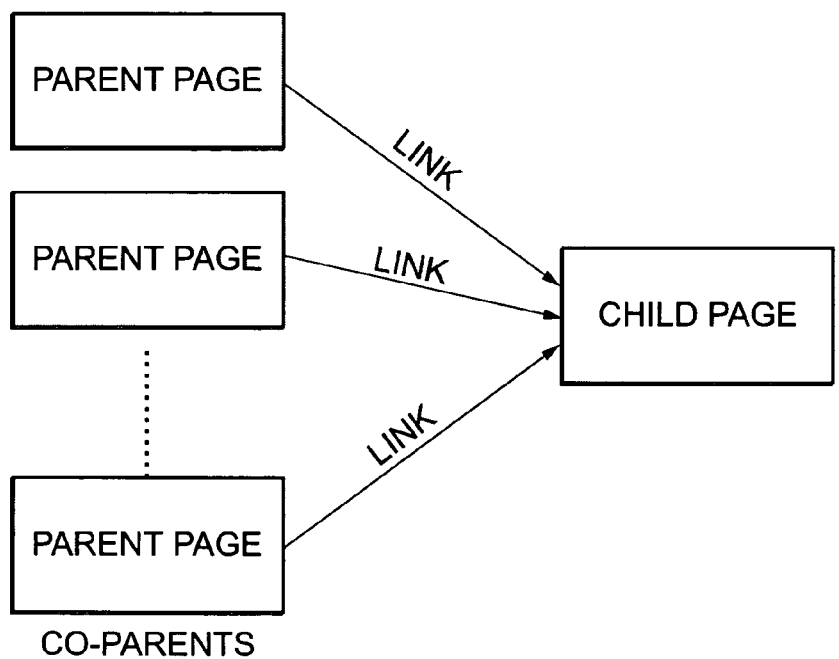
FIG. 25 is a view illustrating link relationships.

Namely, describing with reference to FIG. 25, considering a case where, while focusing on a prescribed child page, a plurality of parent pages (co-parent pages) this child page links to exist, it is also possible for the relationship of these co-parent pages to be determined by a section corresponding to the link relationship information generator 181, with processing at later stages then being carried out using the results of this determination.

Figure 26:
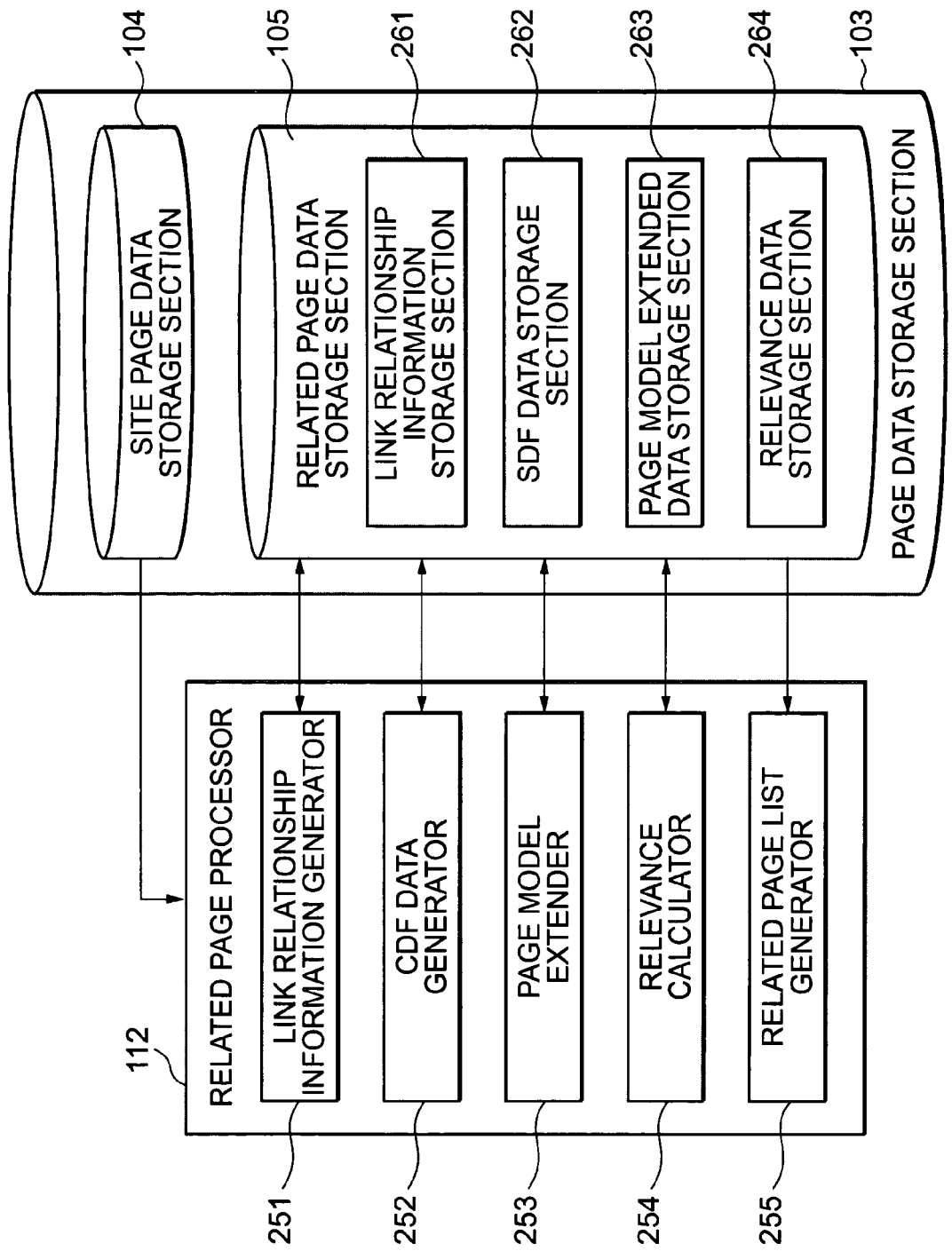
FIG. 26 is a view showing another detailed example of an internal configuration for a search server.

A description is now given of the case of using these determination results. It is possible for the internal configuration of the search server 4 to be similar to the configuration shown in FIG. 5 to FIG. 7. However, the configuration relating to the portion shown in FIG. 7 is as shown in FIG. 26. Comparing the configuration shown in FIG. 7 and the configuration shown in FIG. 26, in the configuration shown in FIG. 26, the SDF data generator 182 and the SDF data storage section 192 of FIG. 7 are replaced with a CDF data generator 252 and a CDF data storage section 262, with other sections of the configuration being the same. However, the data processed at each part is different, and a description is given below as to how they differ.

Figure 27:
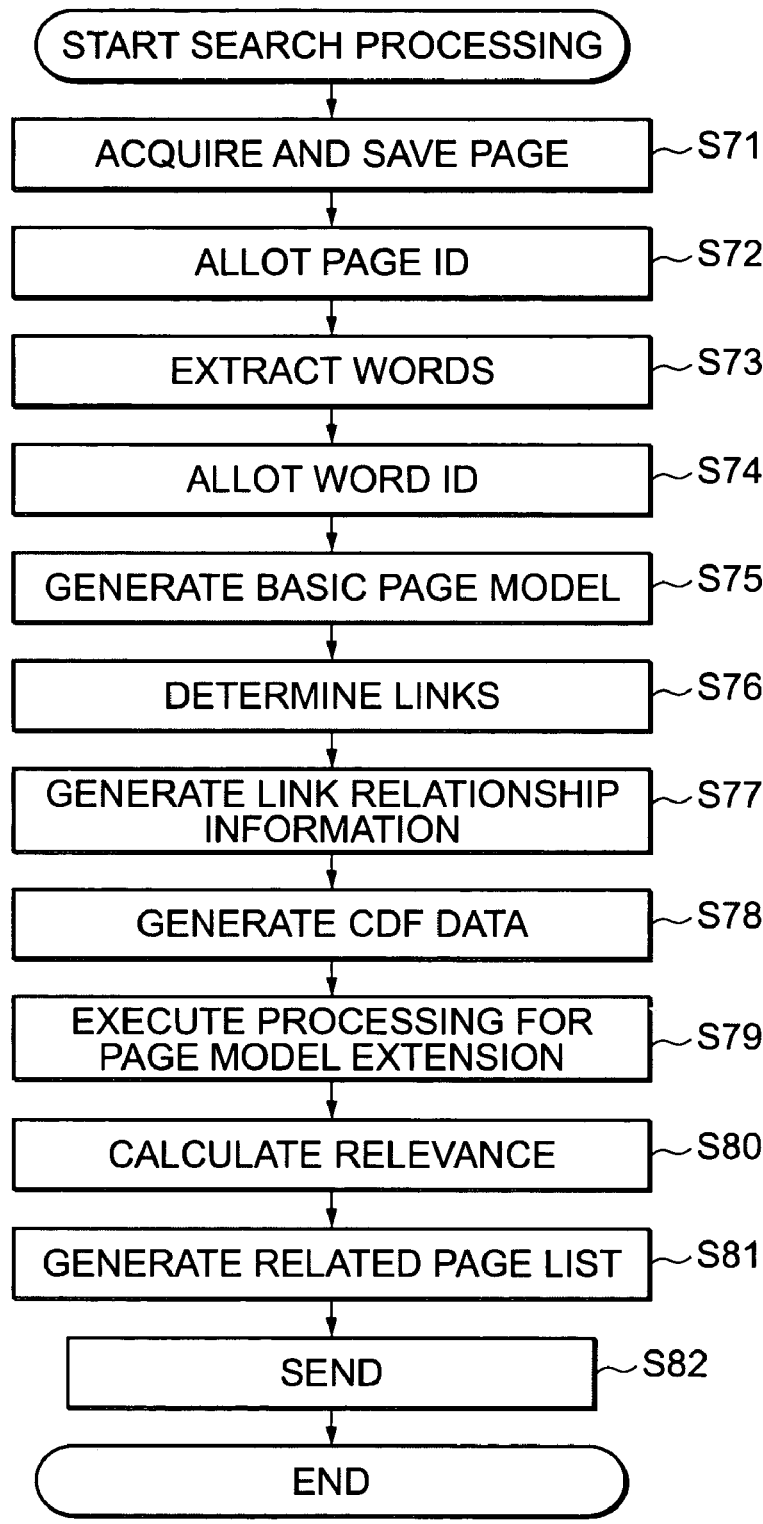
FIG. 27 is a flowchart illustrating the operation of a search server having the configuration shown in FIG. 26.

The operation of the search server 4 that includes the configuration shown in FIG. 26 is carried out in accordance with the process of the flowchart shown in FIG. 27. The operation of the search server 4 that includes the configuration shown in FIG. 26 is described with reference to the flowchart shown in FIG. 27. The processing in steps S71 to S76 is the same as the processing in steps S41 to S46 of the flowchart shown in FIG. 11 and a description thereof is therefore omitted.

Figure 6:
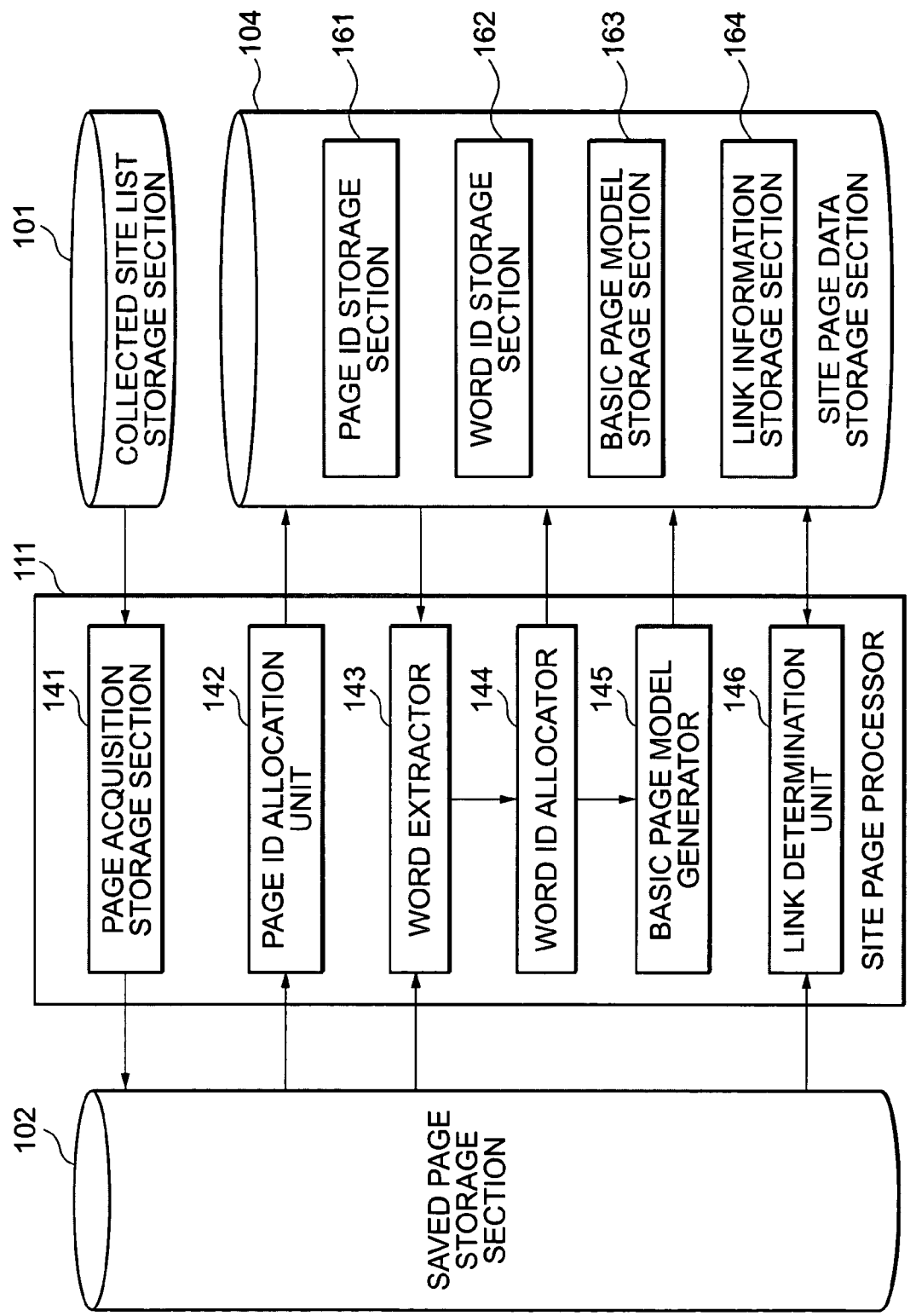
FIG. 6 is a view showing a detailed example of an internal configuration for a search server.

Through the processing in steps S71 to S76, i.e. by having processing performed by, of the configuration within the search server 4, the sections shown in FIG. 6, the data shown in FIG. 13 to FIG. 18 is stored respectively in the saved page storage section 102, the page ID storage section 161, the word ID storage section 162, the basic page model storage section 163 and the link information storage section 164 shown in FIG. 6.

In step S77, link relationship information is generated by a link relationship information generator 251 and this generated data to be stored in a link relationship information storage section 261 is data like the data shown in FIG. 28. As shown in FIG. 28, "Page ID," "Co-Parent page ID," and "Link Weighting" are stored in a correlating manner at the link relationship information storage section 261.

For each page ID, the link relationship information generator 251 carries out processing to extract IDs of pages having co-parent relationships, and calculates weightings for links between the co-parent pages. The calculation of weightings for links between co-parent pages is carried out as follows. Namely, a weighting Wo(u,v) for links between co-parent pages is calculated based on the following equation (11).

$$Wo(u,v)=Wc(u,w) \times Wc(v,w) \tag{11}$$

In equation (11), u, v, w are values fulfilling u,v,w ∈ P where P is a page set, and Wo(u,v) is a value fulfilling 1≦W(u,v).

In equation (11), Wo(u,v) is a weighting for a link between a prescribed page u and a co-parent page v having a co-parent relationship with page u, Wc(u,w) is a weighting for a link between a prescribed page u and a child page w having a parent-child relationship with page u, and Wc(v,w) is a weighting for a link between a prescribed page v and a child page w having a parent-child relationship with the page v.

Weightings of links between co-parent pages are thus calculated, and the results of these calculations are then written as list format data as in FIG. 28.

Returning to the description of the flowchart of FIG. 27, in step S78, the generation of CDF data is carried out by the CDF data generator 252 (FIG. 26). The CDF data generator 252 reads data out from the link relationship information storage section 251 (FIG. 26) and the basic page model storage section 163 (FIG. 6) as necessary, makes list format data like the data shown in FIG. 29 using this read-out data, and stores this data in the CDF data storage section 262.

CDF as used herein is an abbreviation for Co-Parent Document Frequency and, with respect to a word contained in each page (a word that appears in each page), is data that is the sum total of weightings of links for co-parent pages in which that word appears.

The data shown in FIG. 29 stored in the CDF data storage section 262 contains such information as "Page ID," "Word ID included in the Page ID," and "Sum Total of Weightings of Links for Co-Parent pages containing this Word ID." This data is data that is, for each page and with respect to a word appearing in the page, the sum total of weightings for links for co-parent pages in which that word appears. If the link determination unit 146 generates Wc(p,q)=1 as the link weighting as described above, the data would simply indicate the total number of co-parent pages in which the word appears.

In step S79, a page model extender 253 (FIG. 26) executes page model extension processing. Page model extension processing is processing where list format data such as the data shown in FIG. 22 is made and is stored in a page model extended data storage'section 263. The page model extender 253 reads out data stored in the basic page model storage section 163, the link information storage section 164, the link relationship information storage section 261 and the SDF data storage section 262 as necessary in order to make such data as shown in FIG. 22.

Data stored at the page model extended data storage section 263 shown in FIG. 22, as described previously, contains such information as "Page ID" and "Vector." In the embodiment already described, the data was data with a focus on sibling relationships, but in this embodiment, the data is data that focuses on co-parent relationships. The equations used in calculations ("weighting" information within information referred to as "vectors") for this data are therefore different. A description is now given regarding these different equations.

Basically, data relating to weighting of "vectors" is also calculated based on equation (4) even when the focus is on co-parent relationships and weighting is calculated based on ICDF (Inverse Co-Parent Document Frequency). However, Wij contained in equation (4) is calculated based on the following equation (12).

$$Wij=(1+\log(TFij)) \times (1+\log(1/(1+CDFij))) \tag{12}$$

In equation (12), TFij expresses the number of appearances of word j in page i, and a value of 0≦TFij is taken. CDFij indicates the sum total of weightings of links to pages including word j of the co-parent pages of page i.

While it is possible to calculate weighting within vectors using equation (4) and equation (12), it is also possible to substitute equation (13) for equation (12) in order to increase the effect of CDFij.

$$Wij=(1+\log(TFij)) \times (1+\log(1+ACDFi/(1+CDFij))) \tag{13}$$

In equation (13), ACDFi indicates the sum total of weightings of links between page i and all co-parent pages.

Further, TTFij and ATFij may be added, and weighting may be calculated based on the following equation (14) which is based on equation (12), or the following equation (15) which is based on equation (13).

$$Wij=(1+\log(TFij+TTFij+ATFij)) \times (1+\log(1/(1+CDFij))) \tag{14}$$

$$Wij=(1+\log(TFij+TTFij+ATFij)) \times (1+\log(1+ACDFi/(1+CDFij))) \tag{15}$$

In equations (14) and (15), TTFij indicates whether or not a tagged word j appears on page i, and is set to 0 when tagged word j does not appear, and to 1 when tagged word j does appear. Alternatively, it is also possible to set TTFij to the number of appearances (0 or greater). It is also possible to assign weightings according to the type of tag.

Further, ATFij indicates whether or not word j appears within an anchor window of the link source page to page i, and is set to 0 when the word does not appear, and to 1 when the word does appear. Alternatively, it is also possible to set ATFij to the number of appearances (0 or greater). Weighting may also be carried out as with tagged words. It is also possible to assign window weighting according to the distance from an anchor.

In step S80, the relevance between pages is calculated at the relevance calculator 254. The relevance calculator 254 reads data stored in the page model extended data storage section 263 as necessary, makes list format data like the data shown in FIG. 23 and stores the data in the relevance data storage section 264.

The data shown in FIG. 23 stored in the relevance data storage section 264, as described previously, contains such information as "Page ID," "Target Page ID," "Relevance," and "High Relevance Words." Of these, relevance can be calculated using the same equations as when carrying out processing focusing on sibling relationships even when carrying out processing focusing on co-parent relationships. Namely, relevance is calculated based on equation (9), which is already described.

Processing from step S81 onwards is the same as the processing from S51 onwards in FIG. 11, and a description thereof is therefore omitted.

Therefore, in the case of carrying out processing with a focus on co-parent relationships, it is possible to obtain results that are similar to or better than those in the case of carrying out processing focusing on sibling relationships.

As a third embodiment, it is possible to carry out processing taking into consideration both sibling relationships and co-parent relationships. In such a case, too, the configuration of the search server 4 may be as shown in FIG. 5 to FIG. 7. However, the detailed configuration shown in FIG. 7(FIG. 26) is to be as shown in FIG. 30.

Figure 30:
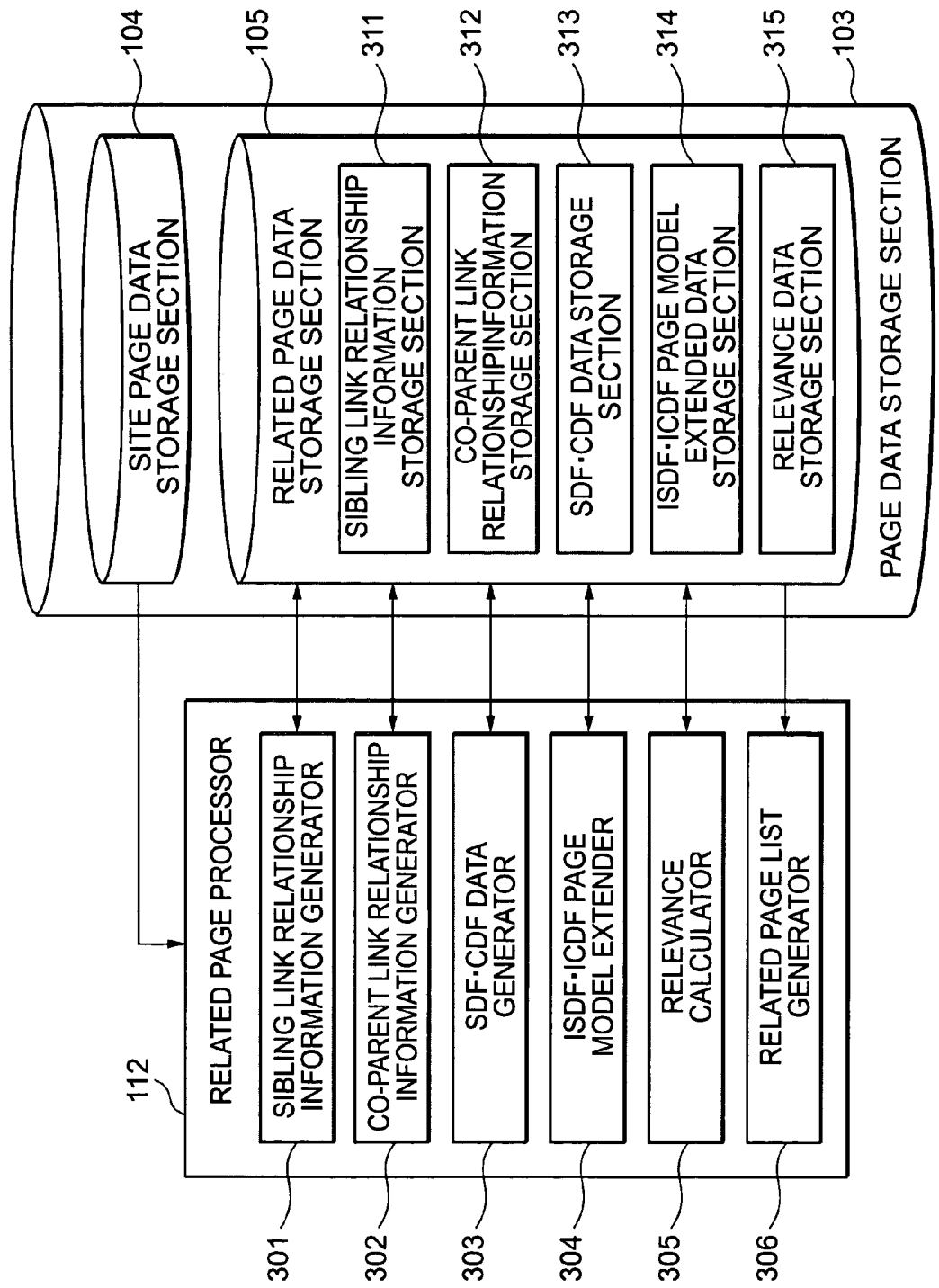
FIG. 30 is a view showing another detailed example of an internal configuration for a search server.

An example of the internal configuration of the search server 4 shown in FIG. 30 is described in relation to FIG. 7 and FIG. 26 already described. The link relationship information generator 181 shown in FIG. 7 or the link relationship information generator 251 shown in FIG. 26 are comprised of a sibling link relationship information generator 301 and a co-parent link relationship information generator 302. A sibling link relationship information storage section 311 and a co-parent link relationship information storage section 312 are respectively provided in the related page data storage section 105 in order to store data generated by each of the link relationship information generators.

The SDF data generator 182 shown in FIG. 7 and the CDF data generator 252 shown in FIG. 26 are comprised of an SDF.CDF data generator 303. The page model extender 183 shown in FIG. 7 or the page model extender 253 shown in FIG. 26 are comprised of an ISDF.ICDF page model extender 304. An SDF.CDF data storage section 313 and ISDF.ICDF page model extended data storage section 314 are respectively provided in the related page data storage section 105 in order to store data generated by the SDF.CDF data generator 303 and the ISDF.ICDF page model extender 304.

Since the other sections are basically the same as those of the configuration shown in FIG. 7 (FIG. 26), descriptions thereof will be omitted.

The operation of the search server 4 including the configuration shown in FIG. 30 is described with reference to the flowchart of FIG. 31. The processing in steps S101 to S106 is the same as the processing in steps S41 to S46 of the flowchart shown in FIG. 11 and a description thereof is therefore omitted.

By having the processing from steps S101 to S106 performed, that is, by having the processing handled by, of the entire configuration of the search sever 4, the sections shown in FIG. 6 performed, the data shown in FIG. 13 to FIG. 18 are stored respectively in the saved page storage section 102, the page ID storage section 161, the word ID storage section 162, the basic page model storage section 163 and the link information storage section 164 shown in FIG. 6.

In step S107, sibling link relationship information is generated by the sibling link relationship information generator 301 (FIG. 30), and this generated data to be stored in the sibling link relationship information storage section 311 is like the data shown in FIG. 19. Namely, the processing of step S107 is similar to the processing of step S47 of FIG. 11, and the data generated by the sibling link relationship information generator 301 is similar to the data generated by the link information relationship information generator 181 shown in FIG. 7. A description thereof is therefore omitted as a detailed description has already been given.

Next, in step S108, co-parent link relationship information is generated by the co-parent link relationship information generator 302 and this generated data to be stored in the co-parent link relationship information storage section 312 is like the data shown in FIG. 28. Namely, the processing of step S108 is similar to the processing of step S77 of FIG. 27, and the data generated by the co-parent link relationship information generator 302 is similar to the data generated by the link information relationship information generator 251 shown in FIG. 26. A description thereof is therefore omitted as a detailed description has already been given.

Figure 31:
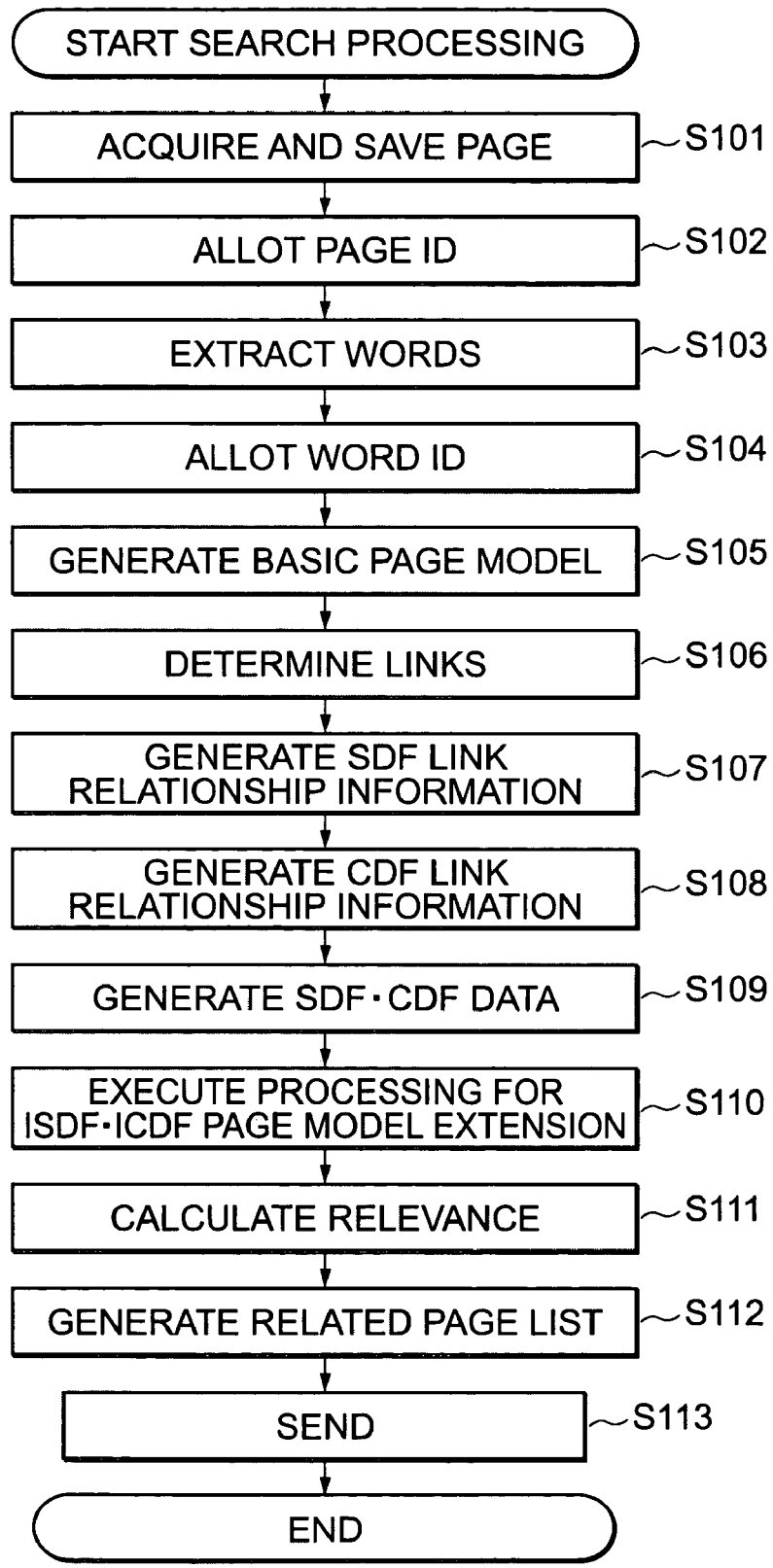
FIG. 31 is a flowchart illustrating the operation of a search server having the configuration shown in FIG. 30.

Returning to the description of the flowchart of FIG. 31, in step S109, the generation of SDF.CDF data is carried out by the SDF.CBF data generator 303 (FIG. 30). The SDF.CDF data generator 303 reads data out from the sibling link relationship information storage section 311, the co-parent link relationship information storage section 312, and the basic page model storage section 163 (FIG. 6) as necessary, makes data of the list format shown in FIG. 21 and FIG. 29 using this read-out data, and stores this data in the SDF.CDF data storage section 313.

The data shown in FIG. 21 is SDF data and the data shown in FIG. 29 is CDF data. The SDF data is generated through similar processing as the processing carried out as the processing of step S48 of FIG. 11 by the SDF data generator 182 of FIG. 7, and the CDF data is generated through similar processing as the processing carried out as the processing of step S78 of FIG. 27 by the CDF data generator 252 of FIG. 26. Since they have already been described, a description thereof will herein be omitted.

Data of the list format shown in FIG. 21 and FIG. 29 may be stored as data of different list formats in the SDF.CDF data storage section 313 or may be stored collectively in a single list format.

Instep S110, the ISDF.ICDF page model extender 304 (FIG. 30) executes ISDF.ICDF page model extension processing. ISDF.ICDF page model extension processing is processing where data of the list format shown in FIG. 22 is made and is stored in the ISDF.ICDF page model extended data storage section 314.

Data stored in the ISDF.ICDF page model extended data storage section 314 is taken to be data like the data shown in FIG. 22, and the data shown in FIG. 22 contains such information as "Page ID" and "Vector" as described previously. With respect to the data shown in FIG. 22, a description was given to the effect that the data is data focusing on sibling relationships or data focusing on co-parent relationships. In the present case, as this is data for when both relationships are focused on, equations used in the calculation of this data ("weighting" information within "Vector" information) are different. A description is now given regarding these different equations.

Basically, data on weighting of "Vector" is also calculated based on equation (4) even when both sibling relationships and co-parent relationships are focused on. Wij in equation (4) is calculated based on the following equation (16).

$$Wij=(1+\log(TFij))\times(1+\log(1/(1+SDFij+CDFij))) \qquad (16)$$

In equation (16), TFij expresses the number of appearances of word j in page i, and a value of $0 \leq TFij$ is taken. SDFij indicates the sum total of weightings of links for, of the sibling pages for page i, pages containing word j, and CDFij indicates the sum total of weighting of links for, of the co-parent pages for page i, pages containing word j.

While it is possible to calculate weighting within vectors using equation (4) and equation (16), it is also possible to perform calculations by substituting equation (17) for equation (16) in order to enhance the effects of SDFij and CDFij.

$$Wij=(1+\log(TFij))\times(1+\log(1+ACDFi+ASDFi/(1+ASDFij+CDFij))) \qquad (17)$$

In equation (17), ASDFi indicates the sum total of weightings of links between page i and all sibling pages, and ACDFi indicates the sum total of weightings of links between page i and all co-parent pages.

Further, TTFij and ATFij may be added, and weighting may be calculated based on the following equation (18) which is based on equation (16), or the following equation (19) which is based on equation (17).

$$Wij=(1+\log(TFij+TTFij+ATFij))\times(1+\log(1/(1+SDFij+CDFij))) \quad (18)$$

$$Wij=(1+\log(TFij+TTFij+ATFij))+(1+\log(1+ASDFi+ACDFi/(1+SDFij+CDFij))) \quad (19)$$

In equation (18) and (19), TTFij indicates whether or not tagged word j appears on page i, and is set to 0 when tagged word j does not appear, and to 1 when tagged word j does appear. Alternatively, it is also possible to set TTFij to the number of appearances (0 or greater). It is also possible to assign weightings according to the type of tag.

Further, ATFij indicates whether or not word j appears within an anchor window of the link source page to page i, and is set to 0 when the word does not appear, and to 1 when the word does appear. Alternatively, it is also possible to set ATFij to the number of appearances (0 or greater). Weighting may also be carried out as with tagged words. It is also possible to assign window weighting according to the distance from an anchor.

Returning to the description of the flowchart of FIG. 31, in step S111, the relevance between pages is calculated at the relevance calculator 305. The relevance calculator 305 reads data stored in the ISDF.ICDF page model extended data storage section 314 as necessary, makes list format data as shown in FIG. 23 and stores this in the relevance data storage section 315.

The data shown in FIG. 23 stored in the relevance data storage section 264, as described previously, contains such information as "Page ID," "Target Page ID," "Relevance," and "High Relevance Words." Of this information, relevance is calculated using a similar equation whether it be processing carried out focusing on co-parent relationships, processing carried out focusing on sibling relationships, or processing carried out focusing on both sibling and co-parent relationships. Namely, calculations are performed based on equation (9), which is already described.

Processing from step S112 onwards is similar to the processing from S51 onwards in FIG. 11, and a description thereof is therefore omitted.

Thus, even in the case of carrying out processing with a focus on both sibling relationships and co-parent relationships, it is possible to obtain results that are comparable to or better than those of cases where processing is carried out focusing on co-parent relationships or where processing is carried out focusing on sibling relationships.

In the embodiments above, a description is given of processing in providing information on related pages to a user, but this related page information may also include information such as advertisements, etc. A configuration for the server 4 in a case where such information as advertisements is also provided is shown in FIG. 32. The configuration for the search server 4 shown in FIG. 32 is the configuration for the search server 4 shown in FIG. 5 with a special settings management storage section 331 added.

The storage sections shown in FIG. 33 and FIG. 34 are also provided in the special settings management storage section 331. Such information as "Title," "Link Destination URL," "Description," "Word," "URL Pattern", and "Owner ID" is contained in a special settings management data storage section 341 as shown in FIG. 33. Such information as "Owner ID," "Name," "Department," "e-mail," "Account," and "Password" is contained in a special settings administrator data storage section 342 shown in FIG. 34.

When the special settings management storage section 331 is provided at the search server 4, in the flowchart shown in FIG. 11, processing for providing information stored in this special settings management storage section 331 is executed as one process in the process of related page list generation. Specifically, after data for a list of related pages is made, the special settings management storage section 331 is referred to, and such information as URLs determined to be related to these related pages is extracted from the special settings management data storage section 341 and included in the list data.

When data provided is reproduced at the user side terminal 3, a list of related pages and information (advertising) bearing some relation to these related pages are displayed on the screen.

Processing such as delete, add, and correct, etc. can be performed by an administrator on the data stored in the special settings management data storage section 341 and data for managing administrators is stored in the special settings administrator data storage section 342. A password etc. is set in order to ensure that only an administrator stored in the special settings administrator data storage section 342 can perform operations on the data stored in the special settings management data storage section 341.

When advertising is also included in the list of related pages, it is also possible to collect a placement fee from the company placing the advertisement. Although not described in the embodiments above, it is also possible, for example, for fees to be collected from administrators administering sites stored in the collected site list storage section 101 of the search server 4.

This is to say that it is anticipated that access to sites will increase as a result of being provided to users by the search server 4 as related pages. It is therefore possible for fees to be collected as registration fees from administrators of sites wishing to register their sites with the search server 4.

It is possible to provide such accounting systems as necessary.

It is possible for the aforementioned series of processes to be executed by hardware having the respective functions, and it is also possible for them to be executed by software. When the series of processes is executed using software, programs constituting the software are installed, from a recording medium for, example, to a computer incorporated into dedicated hardware or to, for example, a general purpose personal computer which is capable of executing various functions by having various programs installed.

As shown in FIG. 2, recording media may be not only packaged media which are provided separately from the personal computer constituting the WWW server 2 and which are distributed to provide programs to users, such as the magnetic disc 31 (including flexible discs), the optical disc 32 (including CD-ROMs (Compact Disc Read-Only Memory) and DVDs (Digital Versatile Discs)), the magneto-optical disc 33 (including MDs (Mini-Discs (registered trademark)), or the semiconductor memory 34 etc., but may also be hard disks included in the ROM 12 or the storage section 18 which are provided to users in a state incorporated in a computer in advance, and in which programs are stored.

In this specification, the steps describing a program provided by a medium need not be processed in chronological order in accordance with the order in which they are described above, and may also be executed in parallel or individually.

Further, in this specification, a "system" expresses the overall device as constructed from a plurality of devices.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. An information processing device comprising:
   acquisition means for acquiring data for pages of a site;
   extraction means for extracting words appearing within said pages using said data for said pages acquired by said acquisition means;
   counting means for counting a number of times said words extracted by said extraction means appear within each page;
   first generating means for analyzing a link structure among said pages acquired by said acquisition means and for generating a first weighting corresponding to pages which are in link relationships, the generating of said first weighting involving the use of at least one count value which is a number of appearances of a word as counted by said counting means;
   second generating means for generating a second weighting corresponding to pages which are in a link relationship with a predetermined page of said pages, the generating of said second weighting involving the use of said first weighting;
   third generating means for generating at least one of sibling document frequency (SDF) data and coparent document frequency (CDF) data using said second weighting generated by said second generating means; and
   calculating means for calculating a page model extension value through page model extension processing based on at least one of inverse sibling document frequency (ISDF) and inverse coparent document frequency (ICDF) using said data generated by said third generating means.

2. The information processing device as claimed in claim 1, wherein said calculating means comprises first calculating means and further comprising second calculating means for calculating a relevance between predetermined pages of said acquired pages using said page model extension value calculated by said first calculating means.

3. The information processing device as claimed in claim 1, wherein
   when said second generating means takes said predetermined page to be a link source and calculates said second weighting for link destination pages linked from said link source, said third generating means generates said SDF data, and said calculating means calculates said page model extension value using page model extension processing based on said ISDF,
   when said second generating means takes said predetermined page to be a link destination and calculates said second weighting for link source pages linking to said link destination, said third generating means generates said CDF data, and said calculating means calculates said page model extension value using page model extension processing based on said ICDF, and
   when said second generating means calculates both said second weighting in which said predetermined page is taken to be a link source and which is for link destination pages linked from said link source, as well as said second weighting in which said predetermined page is taken to be a link destination and which is for link source pages linking to said link destination, said third generating means generates both said SDF data and said CDF data, and said calculating means calculates said page model extension value using page model extension processing based on said ISDF and said ICDF.

4. The information processing device as claimed in claim 1, wherein said calculating means calculates said page model extension value using the number of times a predetermined word appears in said predetermined page and said data generated by said third generating means corresponding to pages containing said predetermined word of pages in a link relationship, which is generated by said second generating means, with said predetermined page.

5. The information processing device as claimed in claim 1, further comprising:
   storage means for storing said relevance calculated by said second generating means, and
   providing means for referring to said relevance stored in said storage means and providing information for pages having high relevance with respect to said predetermined page when a request is made for provision of information for pages related to said predetermined page.

6. The information processing device as claimed in claim 5, wherein said providing means provides information for advertising relating to said predetermined page when providing said information.

7. An information processing method, comprising:
   an acquisition step of acquiring data for pages of a site;
   an extraction step of extracting words appearing within said pages using said data for said pages acquired in said acquisition step;
   a counting step of counting a number of times said words extracted in said extraction step appear within each page;
   a first generating step of analyzing a link structure among said pages acquired in said acquisition step and of generating a first weighting corresponding to pages which are in link relationships, the generating of said first weighting involving the use of at least one count value which is a number of appearances of a word as counted by said counting means;
   a second generating step of generating a second weighting corresponding to pages which are in a link relationship with a predetermined page of said pages, the generating of said second weighting involving the use of said first weighting;
   a third generating step of generating at least one of sibling document frequency (SDF) data and coparent document frequency (CDF) data using said second weighting generated in said second generating step;
   a first calculating step of calculating a page model extension value through page model extension processing based on at least one of inverse sibling document frequency (ISDF) and inverse coparent document frequency (ICDF) using said data generated in said third generating step; and a second calculating step of calculating a relevance between predetermined pages of said acquired pages using said page model extension value calculated in said first calculating step.

8. A recording medium, recorded with a computer-readable program, the program being executable to perform a method comprising:

an acquisition step of acquiring data for pages of a site;

an extraction step of extracting words appearing within said pages using said data for said pages acquired in said acquisition step;

a counting step of counting a number of times said words extracted in said extraction step appear within each page;

a first generating step of analyzing a link structure among said pages acquired in said acquisition step and of generating a first weighting corresponding to pages which are in link relationships, the generating of said first weighting involving the use of at least one count value which is a number of appearances of a word as counted by said counting means;

a second generating step of generating a second weighting corresponding to pages which are in a link relationship with a predetermined page of said pages, the generating of said second weighting involving the use of said first weighting;

a third generating step of generating at least one of sibling document frequency (SDF) data and coparent document frequency (CDF) data using said second weighting generated in said second generating step;

a first calculating step of calculating a page model extension value through page model extension processing based on at least one of inverse sibling document frequency (ISDF) and inverse coparent document frequency (ICDF) using said data generated in said third generating step; and a second calculating step of calculating a relevance between predetermined pages of said acquired pages using said page model extension value calculated in said first calculating step.

\* \* \* \* \*